(12) United States Patent  (10) Patent No.: US 7,577,844 B2
Kirovski  (45) Date of Patent: Aug. 18, 2009

(54) SYSTEMS AND METHODS FOR ENCODING RANDOMLY DISTRIBUTED FEATURES IN AN OBJECT

(75) Inventor: Darko Kirovski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 10/802,981

(22) Filed: Mar. 17, 2004

(65) Prior Publication Data

US 2005/0210255 A1  Sep. 22, 2005

(51) Int. Cl.
*H04L 9/00* (2006.01)
*H04N 7/167* (2006.01)

(52) U.S. Cl. .................... 713/180; 713/176; 380/201

(58) Field of Classification Search ................ 713/176, 713/180; 380/201
See application file for complete search history.

(56) References Cited

U.S. PATENT DOCUMENTS

| | | | |
|---|---|---|---|
| 4,386,233 A | 5/1983 | Smid et al. | |
| 4,424,414 A | 1/1984 | Hellman et al. | |
| 4,567,600 A | 1/1986 | Massey et al. | |
| 4,633,036 A | 12/1986 | Hellman et al. | |
| 4,820,912 A | 4/1989 | Samyn | |
| 4,881,264 A | 11/1989 | Merkle | |
| 4,956,863 A | 9/1990 | Goss | |
| 5,003,597 A | 3/1991 | Merkle | |
| 5,016,274 A | 5/1991 | Micali et al. | |
| 5,299,262 A | 3/1994 | Brickell et al. | |
| 5,384,846 A | 1/1995 | Berson et al. | |
| 5,388,158 A * | 2/1995 | Berson | 713/176 |
| 5,420,924 A | 5/1995 | Berson et al. | |
| 5,469,506 A | 11/1995 | Berson et al. | |
| 5,864,622 A | 1/1999 | Marcus | |
| 5,974,150 A * | 10/1999 | Kaish et al. | 713/179 |
| 6,035,914 A * | 3/2000 | Ramsey et al. | 156/378 |
| 6,193,156 B1 | 2/2001 | Han et al. | |
| 6,536,665 B1 | 3/2003 | Ray et al. | |
| 7,010,167 B1 * | 3/2006 | Ordowski et al. | 382/225 |
| 7,089,420 B1 * | 8/2006 | Durst et al. | 713/176 |
| 7,152,047 B1 * | 12/2006 | Nagel | 705/76 |
| 2005/0131900 A1 * | 6/2005 | Palliyll et al. | 707/10 |

FOREIGN PATENT DOCUMENTS

CA  2595621(A1)  8/2000

(Continued)

OTHER PUBLICATIONS

"Certificate Authority Technology", SC Infosecurity News Magazine, pp. 42-43, Feb. 1999.

(Continued)

*Primary Examiner*—Beemnet W Dada
*Assistant Examiner*—Suman Debnath
(74) *Attorney, Agent, or Firm*—Lee & Hayes, PLLC

(57) ABSTRACT

The described systems and methods described are directed at encoding randomly distributed features in an object. Randomly distributed features in an authentication object are determined. Data representing the randomly distributed features is compressed and encoded with a signature. A label is created and includes the authentication object and the encoded data. The data may be compressed by determining a probability density function associated with the authentication object. Vectors associated with the randomly distributed attributes are determined based, at least in part, on the probability density function. The vectors are encoded using an arithmetic coding algorithm.

29 Claims, 13 Drawing Sheets

FOREIGN PATENT DOCUMENTS

| | | |
|---|---|---|
| DE | 10204870 | 8/2003 |
| EP | 0889448 | 1/1999 |
| EP | 1173001 | 1/2002 |
| RU | 2088971(C1) | 8/1997 |
| WO | WO9119614 | 12/1991 |
| WO | WO 99/17486 | 4/1999 |
| WO | WO 01/43086 | 6/2001 |

OTHER PUBLICATIONS

Chang, "Robust Image Authentication Using Content Based Compression", Multimedia Systems, vol. 9, No. 2, Aug. 2003.

Min-Hui, "An Image Self-Verification Scheme Based on Rehash Technique", 2003 International Conference on Communication Technology, vol. 2, pp. 1883-1886, Apr. 2003.

Rey, "A Survery of Watermarking Algorithms for Image Authentication", EURASIP Journal on Applied Signal Processing, vol. 2002, No. 6, pp. 613-621, Jun. 2002.

Brzakovic et al, "Document Recognition/Authentication Based on Medium-Embedded Random Patterns", Proceedings of the Second International Conference on Tsukuba Science City, Japan, Oct. 20-22, 1993, pp. 95-98.

"Counterfeit Deterrent Features for the Next-Generation Currency Design", Naitonal Materials Advisory Board (NMAB), 4-Description and Assessment of Deterrent Features, pp. 39-86.

"Counterfeit Deterrent Features for the Next-Generation Currency Design (1993)", National Materials Advisory Board (NMAB); Appendix E: Methods for Authentication of Unique Random Patt . . . pp. 117-120.

Pappu, R., "Physical One-Way Functions", www.sciencemag.org, Vo. 297, Sep. 20, 2002, pp. 2026-2030.

Pennebaker et al, "An Overview of the Basic Principles of the Q-Coder Adaptive Binary Arithmetic Coder", IBM Journal of Research and Development, vol. 32, No. 11, Nov. 1988, pp. 717-726.

Rivest, R.L., et al., "A Method for Obtaining Digital Signatures and Public-Key Cryptosystems", 15 pages.

Rivest, R., "The MD5 Message-Digest Algorithm", MIT Laboratory for Computer Science and RSA Data Security, Inc., Apr. 1992, 18 Pages, http:/www.faqs.org/rfcs/rfc1321.html.

Simmons, "Identification of Data, Devices, Documents and Individuals", Proceedings of the Annual International Carnahan Conference on Security Technology, Taipei, Oct. 1-3, 1991, p. 208.

"Using Biometrics for Border Security", United States General Accounting Office, GAO-03-174, Technology Assessment, pp. i-234, Nov. 2002.

Astrachan, "Huffman Coding: A CS2 Assignment", retrieved from <<http://www.cs.duke.edu/csed/poop/huff/info/>>, Feb. 4, 2004.

Menezes, et al., "Handbook of Applied Cryptography", pp. 352-368.

Russian Office Action for PCT Application No. 2005104394, mailed Mar. 6, 2009 (13 pages).

* cited by examiner

SYSTEMS AND METHODS FOR ENCODING RANDOMLY DISTRIBUTED FEATURES IN AN OBJECT

TECHNICAL FIELD

The systems and methods described herein generally relate to counterfeit-resistant and/or tamper-resistant labels, and more particularly, to utilizing randomly distributed features of an object (whether embedded or naturally inherent) to limit unauthorized attempts in counterfeiting and/or tampering with the label.

BACKGROUND OF THE INVENTION

Counterfeiting and tampering of labels cost product marketers and manufacturers billions of dollars each year in lost income and lost customers. With the proliferation of computer technology, generating labels that resemble the genuine item has become easier. For example, a scanner may be utilized to scan a high-resolution image of a genuine label which can then be reproduced repeatedly at a minimum cost. Also, coupons may be scanned, modified (e.g., to have a higher value), repeatedly printed, and redeemed.

Various technologies have been utilized to stop the flood of counterfeiting and tampering in the recent years. One way labels have been secured is by incorporation of bar codes. Bar codes are generally machine-readable code that is printed on a label. Using a bar code scanner, the label with a bar code may be quickly read and authenticated. One problem with current bar coded labels is that an identical label may be used on various items.

Another current solution is to have the scanned bar code examined against secure data stored in a database (e.g., a point of sale (POS) system). This solution, however, requires incorporation of up-to-date data from a marketer or manufacturer. Such a solution requires timely and close cooperation of multiple entities. Also, such a solution limits its implementation flexibility and may not always be feasible.

These technologies, however, share a common disadvantage; namely, the labels scanned are physically identical for a given product. Accordingly, even though the manufacturing process for creating the legitimate labels may be highly sophisticated, it generally does not take a counterfeiter much time to determine a way to create fake pass-offs. And, once a label is successfully copied a single time, it may be repeatedly reproduced (e.g., by building a master copy that is replicated at low cost). Even if a label is black-listed in a database after a given number of uses, there is no guarantee that the labels that are scanned first are actually the genuine labels.

Accordingly, the current solutions fail to provide labels that are relatively hard to copy and inexpensive to produce.

SUMMARY OF THE INVENTION

The systems and methods described herein are directed at encoding randomly distributed features in an object. In one aspect, randomly distributed features in an authentication object are determined. Data representing the randomly distributed features is compressed and encoded with a signature. A label is created and includes the authentication object and the encoded data.

In another aspect, the data is compressed by determining a probability density function associated with the authentication object. Vectors associated with the randomly distributed attributes are determined based, at least in part, on the probability density function. The vectors are encoded using an arithmetic coding algorithm.

DETAILED DESCRIPTION

I. Introduction

The systems and methods described herein are directed at encoding information about the randomly distributed features of an object used in a label. Labels may include any type of identification means that are attached to or incorporated within an item. A label that is configured to be authenticated is referred herein as a certificate of authenticity. An object with randomly distributed features used in a certificate of authenticity is referred to herein as an authentication object. To enable self-authentication, a certificate of authenticity may include both the authentication object and the information about the randomly distributed features. A compression method may be used to increase the amount of information about the randomly distributed features that can be encoded and included in the certificate of authenticity. According to one example calculation, the cost of forging a certificate of authenticity is exponentially increased proportional to the improvement in compressing the information. This substantial increase in forging cost results in a reliable certificate of authenticity that is relative cheap to manufacture but is difficult to falsify.

Figure 1:
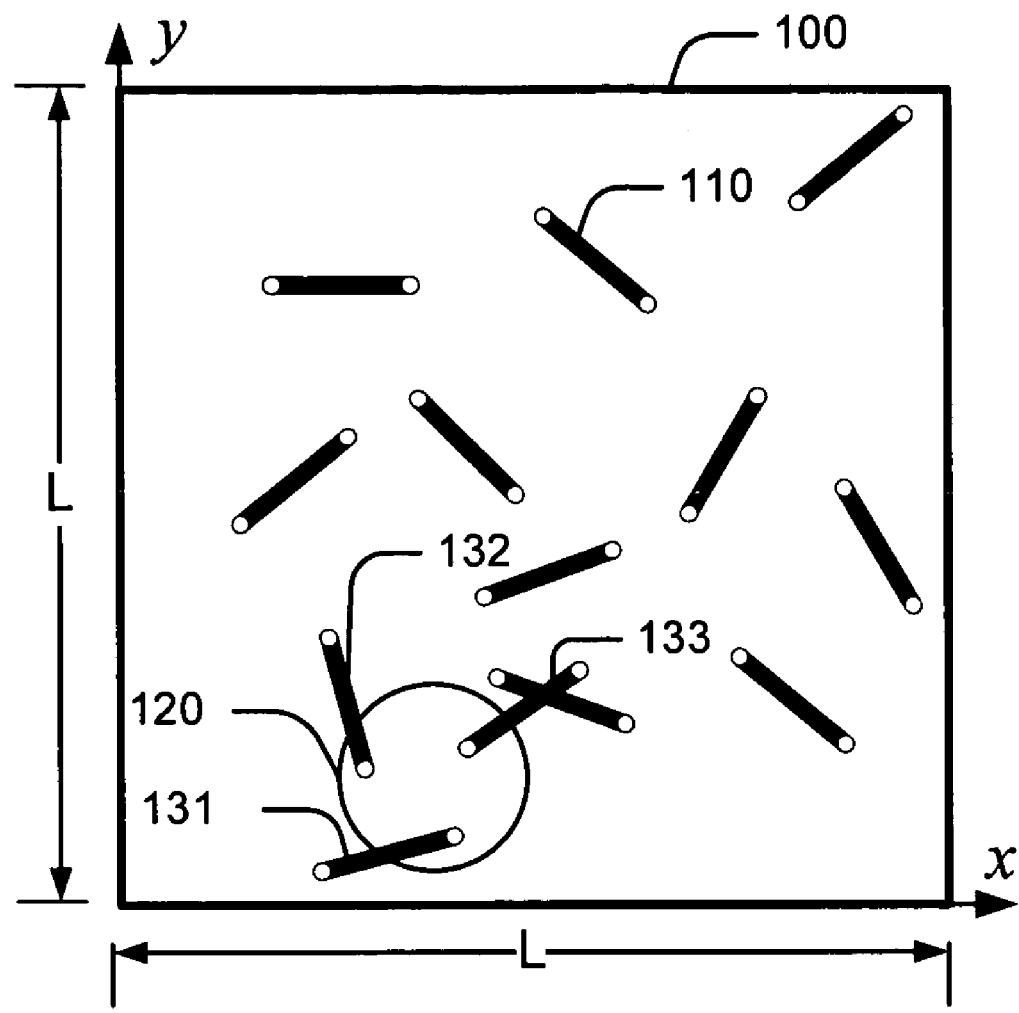
FIG. 1 shows an example authentication object for use as part of a label, such as a certificate of authenticity.

FIG. 1 shows an example authentication object 100 for use as part of a label, such as a certificate of authenticity. To be effectively used in a certificate of authenticity, authentication object 100 typically contains randomly distributed features that are unique and are hard to replicate. The example authentication object 100 shown in FIG. 1 is part of a fiber-based certificate of authenticity and contains fibers 110 that are embedded in the object in a random manner. Fibers 110 serve as the randomly distributed features of authentication object 100. Fibers 110 may be incorporated in authentication object 100 by any means. For example, fibers 100 may be sprayed onto authentication object 100. Fibers 100 may also be embedded into authentication object 100 during the manufacturing process. In one embodiment, fibers 110 are optical fibers capable of transmitting light between their endpoints. Thus, by shedding light on a certain region 120 of authentication object 100, endpoints of fibers 131-133 that have at least one end-point within the lit up region are illuminated.

In FIG. 1, authentication object 100 includes κ randomly distributed fibers. Authentication object 100 may be scanned at a resolution of L×L pixels. Each fiber has a fixed length of R. Although the example authentication object 100 in FIG. 1 contains fibers, it is to be understood that authentication objects with other randomly distributed features may also be used in a certificate of authenticity in a similar manner.

The randomly distributed features of authentication object 100 may be used in a certificate of authenticity to protect the proof of authenticity of an arbitrary object, such as a product. For example, certain hard-to-replicate data about the randomly distributed features of the certificate of authenticity may be digitized, signed with the private key of the issuer, and the signature may be imprinted on the certificate of authenticity in a machine-readable form to validate that the produced instance is authentic. Each instance of the certificate of authenticity is associated with an object whose authenticity the issuer wants to vouch. In one embodiment, verification of authenticity is done by extracting the signed data (data about the randomly distributed features) using the public key of the issuer and verifying that the extracted data matches the data of the associated instance of the certificate of authenticity. In order to counterfeit protected objects, the adversary needs to either: (i) figure out the private key of the issuer, (ii) devise a manufacturing process that can exactly replicate an already signed instance of the certificate of authenticity, or (iii) misappropriate signed instances of the certificate of authenticity. From that perspective, the certificate of authenticity can be used to protect products whose value roughly does not exceed the cost of forging a single certificate of authenticity instance, including the accumulated development of a successful adversarial manufacturing process.

A goal of a certificate of authenticity system is to ensure the authenticity of products or certain information associated with a product. The set of applications is numerous and broad, ranging from software and media (e.g., DVD, CD) anti-piracy to unforgeable coupons and design of tamper-proof hardware. For example, creating a tamper-resistant chip would require coating its package with a certificate of authenticity. Before each usage, the integrity of the certificate of authenticity should be verified in order to verify authenticity of the protected silicon.

Below, example hardware platforms for inexpensive but efficient read-out of the randomly distributed features of a fiber-based certificate of authenticity will be discussed. The hardware platforms may include a barcode. Since the capacity of a barcode for low-cost readers is limited to about 3K bits, the message signed by the private key is limited to the same length. Also, since one of the goals of a certificate of authenticity system is to maximize the effort of the adversary who aims at forging a specific instance of the certificate of authenticity, the problem associated with storing in the fixed-length signed message as much as possible information about the unique and randomly distributed features of a fiber-based certificate of authenticity will be discussed. An example analytical model for a fiber-based certificate of authenticity will be provided. Then, the discussion below will also formalize the problem of compression of a point set, and show that optimal compression of fibers' positions in an instance of a certificate of authenticity is an NP-complete problem. In order to heuristically address this problem, an algorithm which significantly improves upon compression ratios of conventional compression methodologies will be provided.

II. Issuing and Verifying Certificate of Authenticity

Figure 2:
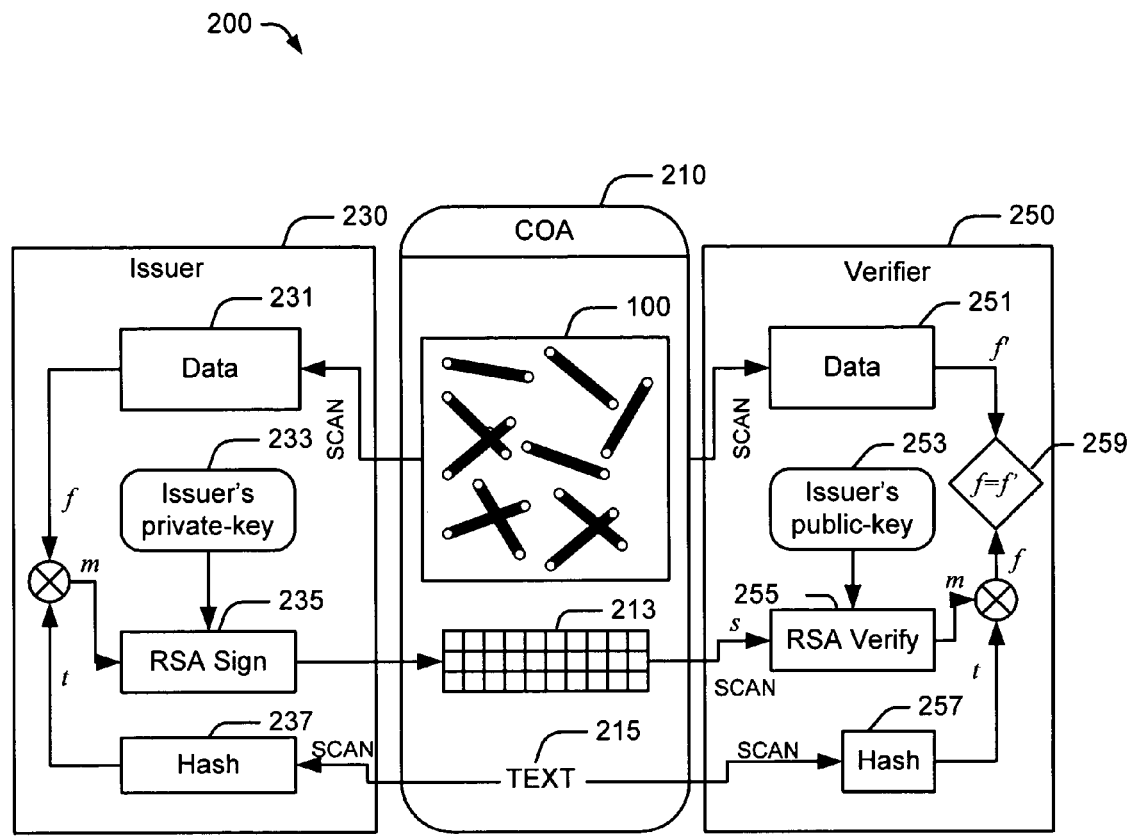
FIG. 2 is a schematic diagram illustrating an example certificate of authenticity system and example procedures employed by the system for issuing and verifying a certificate of authenticity.

FIG. 2 is a schematic diagram illustrating an example certificate of authenticity system 200 and example procedures employed by the system for issuing and verifying a certificate of authenticity. Certificate of authenticity system 200 includes certificate of authenticity 210, an issuer 230, and a verifier 250. As shown in FIG. 2, certificate of authenticity 210 may include the authentication object 100 in FIG. 1, a barcode 213, and text 215.

The information that needs to be protected on a certificate of authenticity includes: (a) the representation of the hard-to-replicate randomly distributed features of authentication object 100 and (b) an arbitrary associated textual data. Initially, the randomly distributed features of authentication object 100, such as locations of fibers, are scanned using a hardware device. Details on how this information is collected and represented will be discussed below in conjunction with FIG. 3.

For the purpose of discussion, assume that the resulting information $f$ is a random string of $n_F$ bits. Parameter $n_F$ is fixed and equals $n_F = k \cdot n_{RSA}, k \in N$, where $n_{RSA}$ is the length of an RSA public-key (for example, $n_{RSA} = 1024$) and κ is commonly set to k∈[1,3]. Given a fixed $n_F$, the digest $f$ of data 231 representing the randomly distributed features of authentication object 100 may statistically maximize the distance between any two distinct certificate of authenticity instances. This goal translates directly to minimized likelihood of a false negative and false positive during the verification step.

The textual data t is an arbitrary string of characters which depends on the application (e.g., expiration date, manufacturer's warranty). The textual data is derived from text 215, which is printed on certificate of authenticity 210 as shown in FIG. 2.

The textual data may be hashed using a cryptographically secure hash algorithm 237, such as SHA1. The output of the hash function is denoted as a message t with $n_T$ bits. Issuer 230 creates the message m that may be signed by RSA. For example, messages $f$ and t are merged into a message m of length $n_M = n_F$ using a reversible operator ⊗ that ensures that each bit of m is dependent upon all bits from both $f$ and t. This step may maximize the number of bits that need to be manipulated in data 231 as well as text 215 to create a certain message m. An example of such an operator is symmetric encryption $m = t \otimes f \equiv E_t(f)$ of $f$ using t or certain subset of bits from t as a key. Message m is signed with an RSA signature 235 using the private-key 233 of the issuer 230. Each $n_{RSA}$ bits of m are signed separately. The resulting signature s has $n_S = n_M = n_F$ bits. This message is encoded and printed as barcode 213 (such as barcodes that obey the PDF417 standard) onto certificate of authenticity 210.

The verification of certificate of authenticity 210 involves several steps. Verifier 250 initially scans the printed components: text 215 and barcode 213. Barcode 213 is decoded into the originally printed signature s. Text 215 is scanned and is hashed in order to create the message t. Note that generic optical character recognition (OCR) is not required for this task because the font used to print the text is known to the verifier 250 and optimized for improved OCR. For successful certificate of authenticity verification, text 215 and barcode 213 need to be read without errors; a task which is readily achievable with modern scanning technologies.

Verifier 250 performs the RSA signature verification 255 on s using issuer's public-key 253 and obtains the signed message m. Verifier 250 can then compute $f=m(\otimes)^{-1}t$. In the example of using encryption as $\otimes$, this is achieved via decryption $f=E_t^{-1}(m)$. Next, verifier 250 scans data 251 of representing the randomly distributed features in authentication object 251 and creates their presentation f'. Verifier 250 compares f' to the extracted f. Verifier 250 needs to quantify the correlation between the two sets of data: the one attached to the certificate and the one used to create the signature on the certificate of authenticity. At decision block 259, if the level of similarity of the two sets of data surpasses a certain threshold, verifier 250 announces that the certificate of authenticity 210 is authentic and vice versa.

Figure 3A:
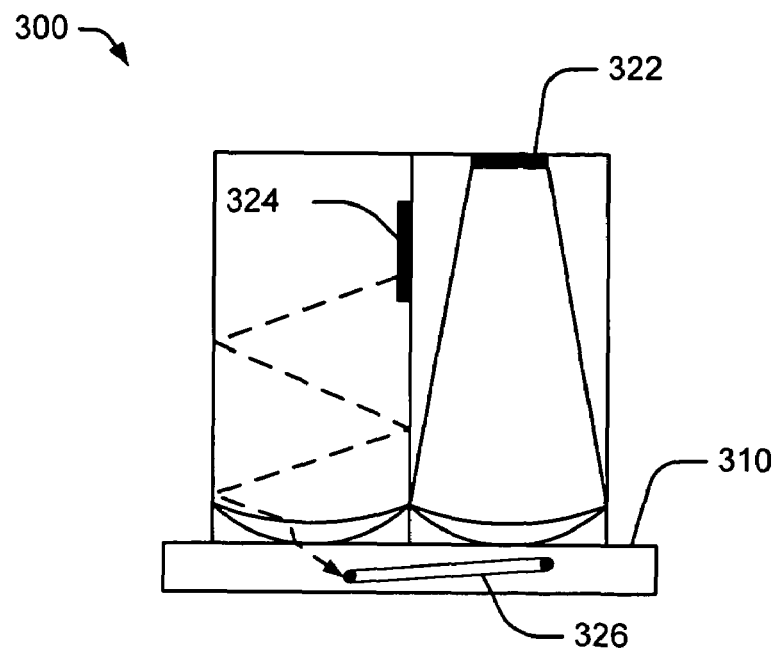
FIG. 3A is a schematic diagram of an example scanning system for capturing randomly distributed features of an authentication object associated with a certificate of authenticity.

FIG. 3A is a schematic diagram of an example scanning system 300 for capturing randomly distributed features of authentication object 310 associated with a certificate of authenticity. Scanning system 300 includes optical sensor 322 and light source 324. Optical sensor 322 is configured to scan authentication object 310 and may include a charged coupled device (CCD) matrix of a particular resolution. In one embodiment, optical sensor 322 has a resolution of 128× 128 pixels. Light source 324 is configured to provide light of a particular wavelength to illuminate a region of authentication object 310. Light source 324 may include, for example, a light emitting diode (LED). As shown in FIG. 3A, one end of fiber 326 in authentication object 310 is illuminated by light source 324. The light is transmitted to the other end of fiber 326 and is sensed by optical sensor 322.

Figure 3B:
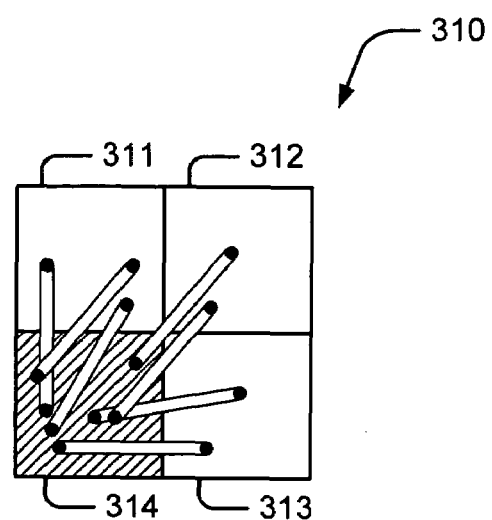
FIG. 3B is a top view of the authentication object shown in FIG. 3A.

FIG. 3B is a top view of the authentication object 310 in FIG. 3A. In operation, the scanning system 300 divides authentication object 310 into regions, such as regions 311-314. As shown in FIG. 3B, light source 324 of scanning system 300 sheds light onto region 314 while regions 311-313 are isolated from light source 324. By illuminating region 314, the location of the endpoints in regions 311-313 of authentication object 310 can be determined by optical sensor 322. Thus, the read-out of the randomly distributed features in authentication object 310 includes four digital images that contain four different point-sets. Each point-set is associated with a particular region and is determined by illuminating that region.

It is conceivable that advancement in technology, such as nanotechnology, may enable an electronic device to decode the randomly distributed features from a certificate of authenticity and create a light pattern that corresponds to these features. Such a device may be able to forge the certificate of authenticity. In one embodiment, scanning system 300 may be configured to prevent this method of forging by changing the wavelength (e.g. color) of the light used by light source 324. For example, the wavelength of the light may be randomly selected each time an authentication object is scanned by scanning system 300. Optical sensor 322 may be configured to detect the wavelength of the light emitted by the fibers in the authentication object and to determine whether that wavelength corresponds to the wavelength of the light emitted by light source 324. If the wavelengths of the emitted and detected light do not match, the certificate of authenticity is likely a forgery.

Figure 4:
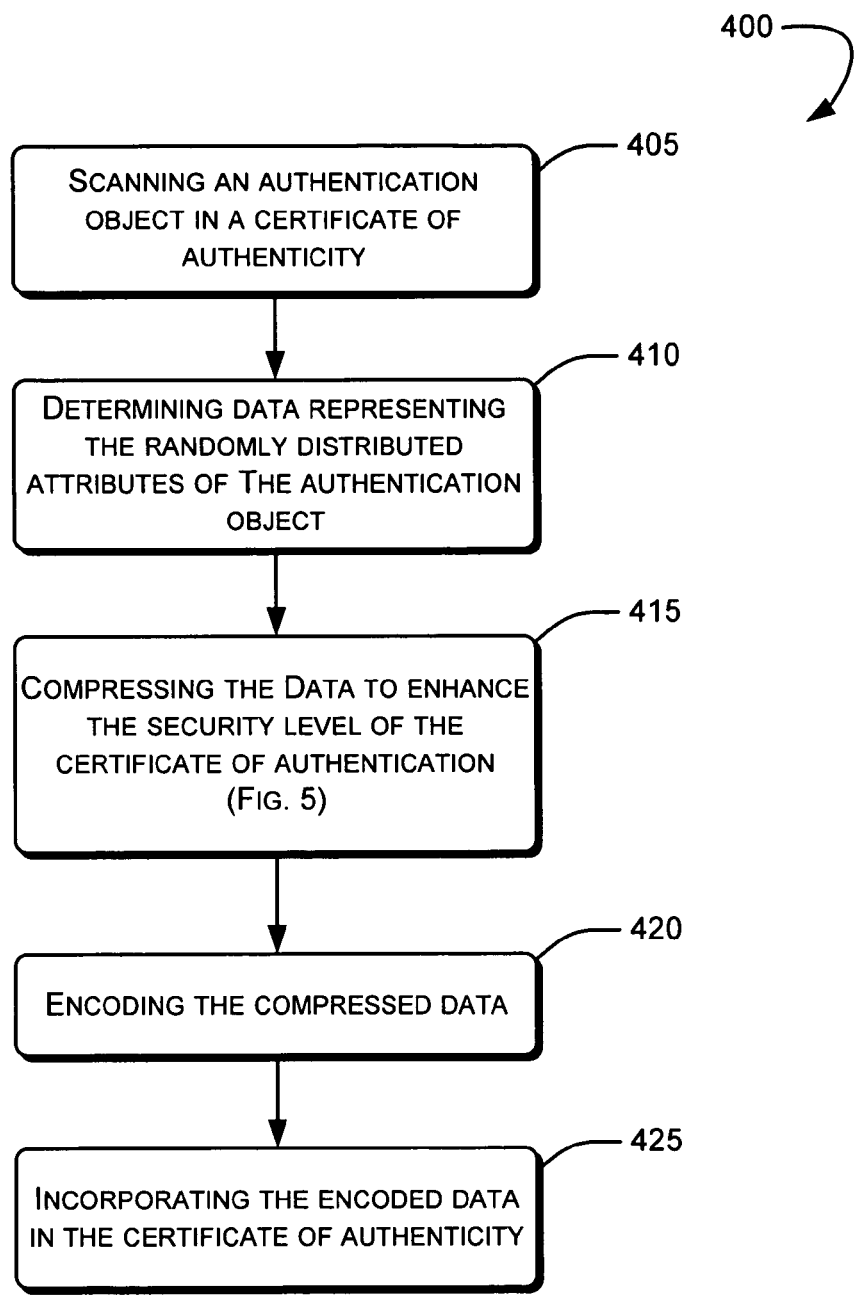
FIG. 4 is a flow diagram of an example process that may be used to create a certificate of authenticity.

FIG. 4 is a flow diagram of an example process 400 that may be used to create a certificate of authenticity. At block 405, the authentication object in a certificate of authenticity is scanned. The authentication object may be scanned using scanning system 300 in FIG. 3A.

At block 410, data representing the randomly distributed attributes of the authentication object is determined. In a fiber-based authentication object, the data may include the positions of the endpoints of fibers that are illuminated, such as the endpoints shown in FIG. 3B.

At block 415, the data is compressing to enhance the security level of the certificate of authenticity. Data compression will be discussed in detail in conjunction with FIG. 5. Briefly stated, a path may be determined for compressing a portion of the data representing randomly distributed attributes in the authentication object.

At block 420, the compressed data is encoded. For example, the compressed data may be signed using private-key 233 in FIG. 2. At block 425, the encoded data is incorporated in the certificate of authenticity. For example, the encoded data may be printed onto the certificate of authenticity as a barcode, such as barcode 213 in FIG. 2.

Figure 5:
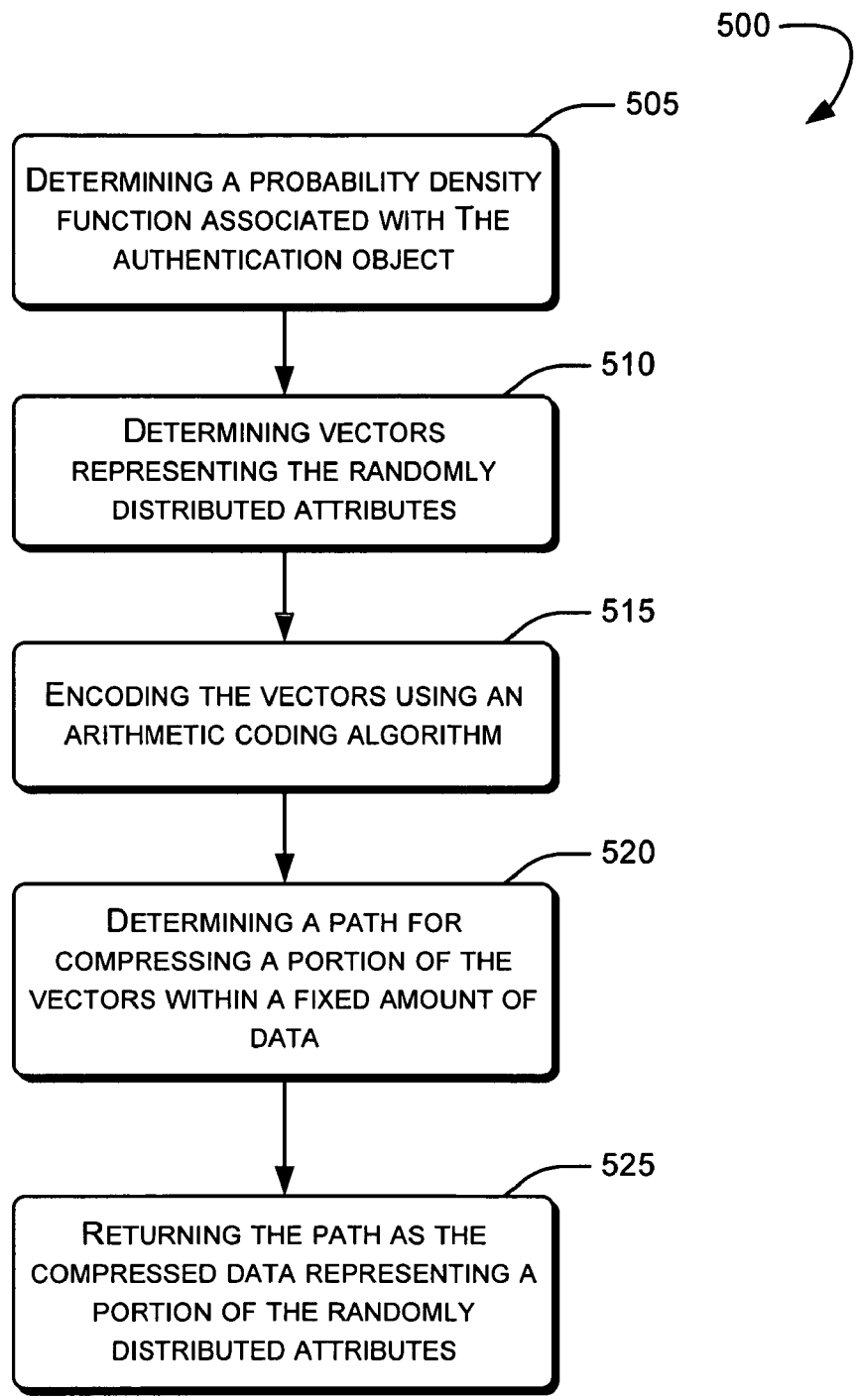
FIG. 5 is a flow diagram of an example process that may be used to compress data that represents the randomly distributed attributes of an authentication object.

FIG. 5 is a flow diagram of an example process 500 that may be used to compress data that represents the randomly distributed attributes of an authentication object. For the purpose of discussion, process 500 will be described in the context of a fiber-based certificate of authenticity. However, process 500 may be applied to any type of certificate of authenticity.

Figure 8:
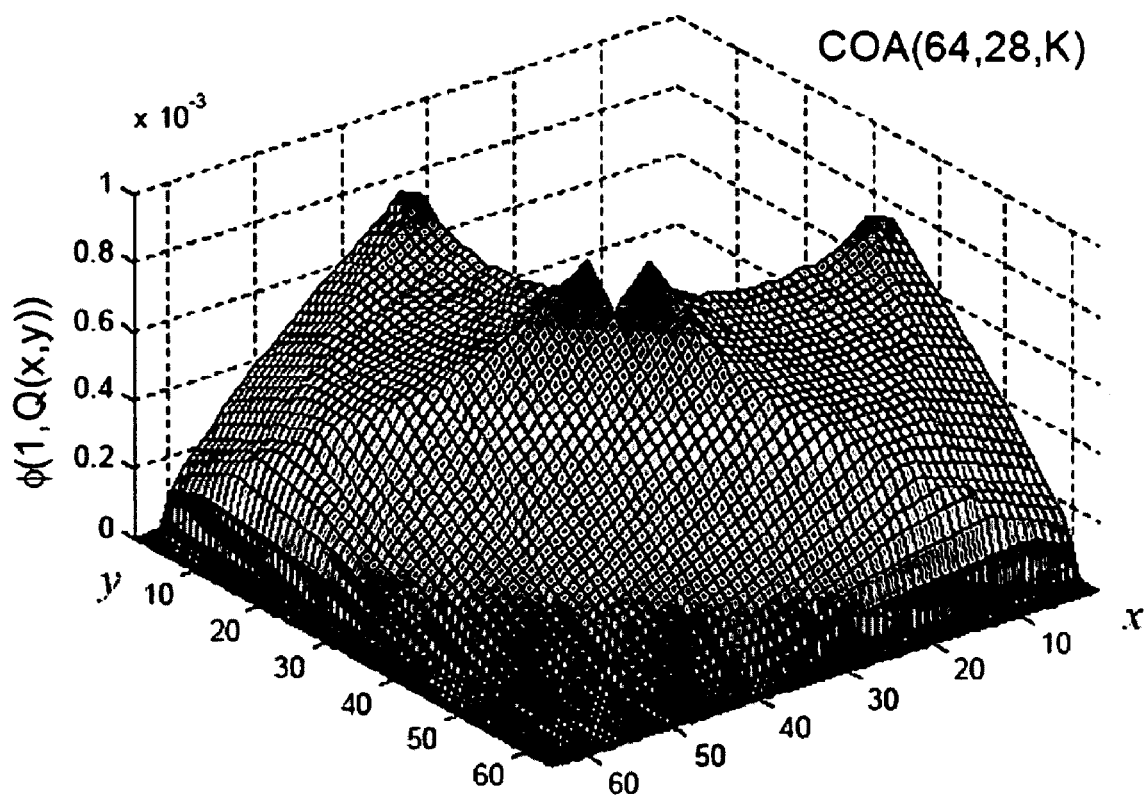
FIG. 8 is a graph of an example of the probability density function for a square authentication object.

At block 505, a probability density function associated with the authentication object is determined. Probability density function will be discussed in Section III-A. An example probability density function is shown in Equation 11. A graphical presentation of the example probability density function is illustrated in FIG. 8. Briefly stated, the probability density function represents the likelihood that a unit of the randomly distributed attributes is found in a certain location of the authentication object. In the context of a fiber-based certificate of authenticity, the probability density function may represent the probability that a particular point in a region of the authentication object is illuminated. The probability density function may also be used to compute how many of the total fibers will be illuminated in a particular region.

At block 510, vectors associated with the randomly distributed attributes are determined. In the context of a fiber-based certificate of authenticity, point-to-point vectors are used and will be discussed in Section IV-A. In particular, Equation 16 may be used to compute point-to-point vectors to represent the randomly distributed attributes in a fiber-based certificate of authenticity.

At block 515, the vectors are encoded using an arithmetic coding algorithm. Arithmetic coding algorithm will be discussed in Section IV-A. An example algorithm is shown in Table 2.

At block 520, a path for compressing a portion of the vectors within a fixed amount of data is determined. The method for computing the path is discussed in Section IV-B. The example path may be computed using Equation 20. At block 525, the path of the compressed data representing a portion of the randomly distributed attributes is returned.

III. Certificate of Authenticity Model

In this section, an analytical model of a fiber-based certificate of authenticity is discussed. Two features of a certificate of authenticity S are modeled. Given that a particular region $S_i$ of the certificate of authenticity is illuminated, the probability density function that a particular point in $S-S_i$ is illuminated is computed. Also, given that K fibers are in S, the expected number of fibers that are illuminated in $S-S_i$ is also computed.

A. Distribution of Illuminated Fiber End-Points

An authentication object (L,R,K) is modeled as a square with an edge of L units and K fibers of fixed length $R \leq L/2$ randomly thrown over the object. Other model variants, such as variable fiber length or arbitrary shape authentication object, can be derived from this model. The authentication object is positioned in the positive quadrant of a 2D Cartesian coordinate system as illustrated in FIG. 1. In addition, the authentication object is divided into four equal squares $S=\{S_1, S_2, S_3, S_4\}$. Each of them is used to record the 3D fiber structure as described above in conjunction with FIGS. 3A and 3B. Next, a fiber is denoted as a tuple $f=\{A, B\}$ of points $A, B \subset S$ such that the distance between them is $\|A-B\|=R$.

Definition 1. Distribution of Illuminated Fiber End-Points. Given that one of the squares $S_i$ is illuminated, the probability density function (pdf) $\phi(i,Q(x,y))$ is defined for any point $Q(x, y) \subset S-S_i$ via the probability $\xi(i, P)$ that any area $P \subset S-S_i$ contains an illuminated end-point A of a fiber $f=\{A, B\}$, conditioned on the fact that the other end-point B is located in the illuminated region $S_i$. More formally, for any $P \subset S-S_i$:

$$\xi(i, P) = Pr[A \subset P \mid f = \{A, B\} \subset S, B \subset S_i] \quad (6)$$
$$= \iint_{Q(x,y) \subset P} \varphi(i, Q(x, y)) dx dy.$$

Assume that throwing a fiber $f=\{A, B\}$ into an authentication object consists of two dependent events: (i) first end-point A lands on the authentication object and (ii) second end-point B hits the authentication object. While A can land anywhere on the COA, the position of B is dependent upon the location of A. Endpoint B must land on part of the perimeter of the circle centered around A, with a radius R, and contained within the authentication object. In the remainder of this subsection, the function $\phi(i,Q(x,y))$ is analytically computed based on the analysis of the events (i-ii). For brevity, only $\phi(1,Q(x, y))$ is computed for the case when region $S_1$ is lit up. $\phi(1, Q(x, y))$ are computed in two steps.

Definition 2. Perimeter Containment. First, for a given point $A \subset S$, the perimeter containment function $\rho(A)$ is defined, which measures the length of the part of the perimeter (arc) of the circle centered at A with radius R that is encompassed by the entire authentication object S. There are four different regions in the authentication object (marked P1 through P4 in FIG. 6) where $\rho(A)$ is uniformly computed.

Figure 6:
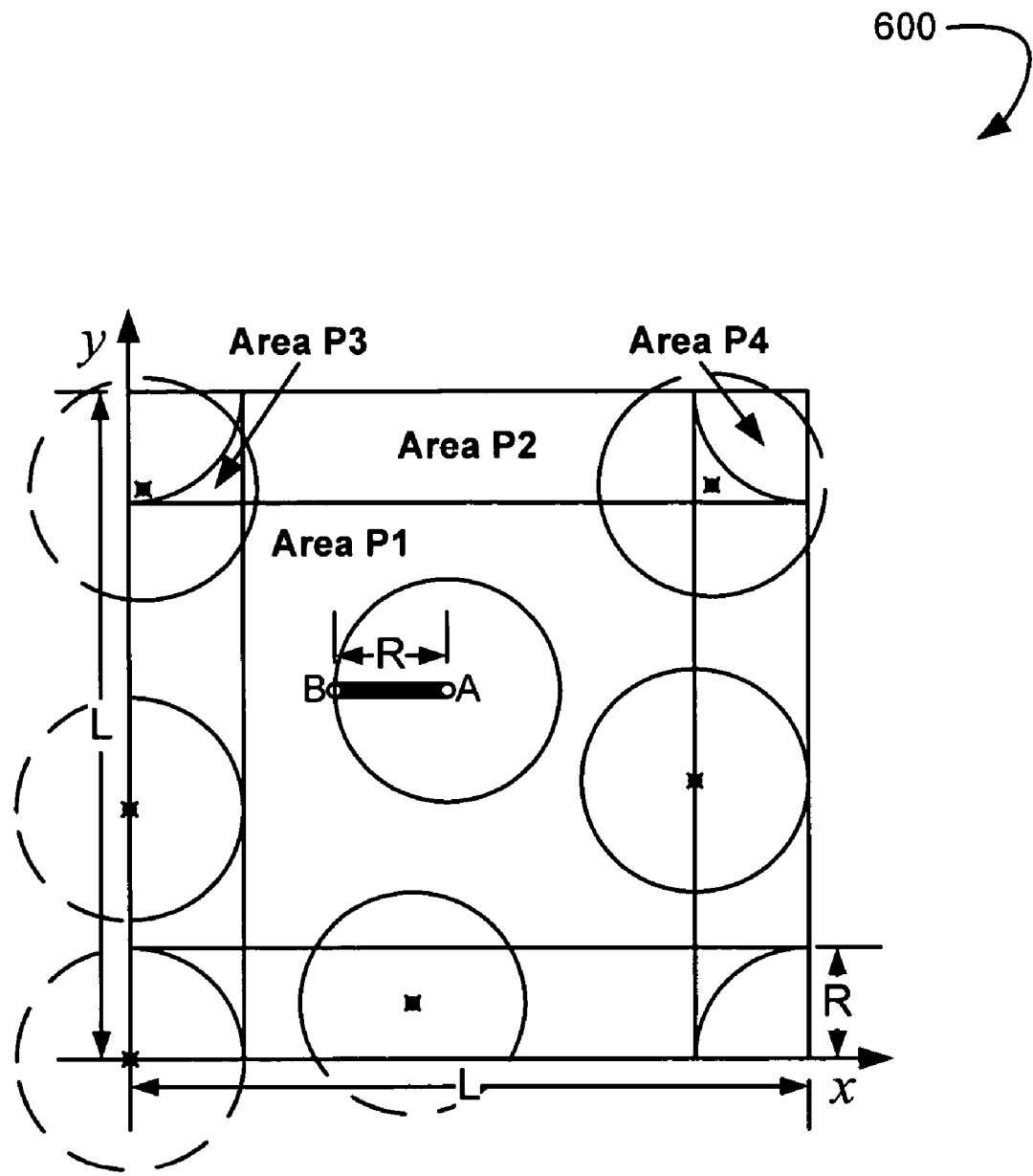
FIG. 6 is a graphical representation of areas that correspond to four different regions in an example authentication object.

FIG. 6 is a graphical representation of areas P1-P4 that correspond to the four different regions in an example authentication object 600. For each point in a certain area Px, the perimeter containment function is computed using a closed analytical form distinct for that area using Equations 7-10 as discussed below.

AREA P1. This is the central area of the authentication object, where for any point $Q \subset P1$, the circle with radius R centered at Q does not intersect with any of the edges of the authentication object. The area is bounded by: $R \leq x \leq L-R$, $R \leq y \leq L-R$.

$$\rho(Q(x,y)) = 2R\pi. \quad (7)$$

AREA P2. There are four different P2 regions, where a circle with radius R centered at any point $Q \subset P2$ intersects twice with exactly one edge of the authentication object. For brevity, consideration is give only for the following one: $R \leq x \leq L-R$, $0 \leq y < R$. Equations for other three regions can be symmetrically computed.

$$\rho(Q(x, y)) = R\left[\pi + 2 \arcsin\left(\frac{y}{R}\right)\right]. \quad (8)$$

AREA P3. There are four different P3 regions, where a circle with radius R centered at any point $Q \subset P3$ intersects twice with two different edges of the authentication object. Consideration is give only for the following one: $0 \leq x < R$, $0 \leq y < R$, $x^2+y^2 \geq R^2$.

$$\rho(Q(x, y)) = 2R\left[\pi - \arccos\left(\frac{x}{R}\right) - \arccos\left(\frac{y}{R}\right)\right]. \quad (9)$$

AREA P4. There are four different P4 regions, where a circle with radius R centered at any point $Q \subset P4$ intersects once with two edges of the COA. Consideration is give only for the following one: $x^2+y^2 < R^2$.

$$\rho(Q(x, y)) = R\left[\frac{\pi}{2} + \arcsin\left(\frac{x}{R}\right) + \arcsin\left(\frac{y}{R}\right)\right]. \quad (10)$$

In all Equations 8-10, only the return values of functions $\arcsin(\cdot)$ and $\arccos(\cdot)$ that are within $\{0, \pi/2\}$ are considered.

In the second step, the actual $\phi(1,Q(x,y))$ is computed based on the fact that an illuminated endpoint A of a fiber $f=\{A,B\}$ is at position $A=Q(x,y)$ only if B is located on the part(s) of the circle $C(Q,R)$ centered at $Q(x,y)$ with a diameter R and contained by $S_1$.

Lemma 3. Dependence of $\phi(i,Q(x,y))$ from $\rho(Q(x,y))$. Using function $\rho(Q(x,y))$, pdf $\phi(i,Q(x,y))$ is computed using the following integral:

$$\varphi(i, Q(x, y)) = \int_{C(Q,R) \subset S_i} \frac{\alpha R d\vartheta}{\rho(Q(x + R \cos\vartheta, y + R \sin\vartheta))}. \quad (11)$$

where $\rho$ browses the perimeter of $C(Q, R) \subset S_i$ and $\alpha$ is a constant such that:

$$\iint_{Q(x,y) \subset S-S_i} \varphi(i, Q(x, y)) dx dy = 1. \quad (12)$$

A point $Q \subset S-S_i$ can be illuminated only due to a fiber $f=\{Q, B\}$, such that $B \subset S_i$. This implicates that B is located somewhere on the perimeter of the circle $C(Q, R)$ contained by $S_i$. For a given fiber $f=\{A, B\}$, the probability that A lands on a specific infinitesimally small arc of length $dl \subset S$, is equal to $dl/\rho(B)$. Hence:

$$\varphi(i, Q) = \text{area}(S - S_i)^{-1} \int_{C(Q,R) \subset S_i} \frac{4R d l d\vartheta}{\rho(B(Q, R, \vartheta) \subset C) d l}, \quad (13)$$

where function area $(S-S_i)$ computes the area under $S-S_i$. Thus, the pdf $\phi(1,Q(x, y))$ at a point $Q \subset S-S_1$ is proportional to the integral of the inverse of the value of $\rho(\cdot)$ over $C(Q, R) \subset S_1$.

Figure 7:
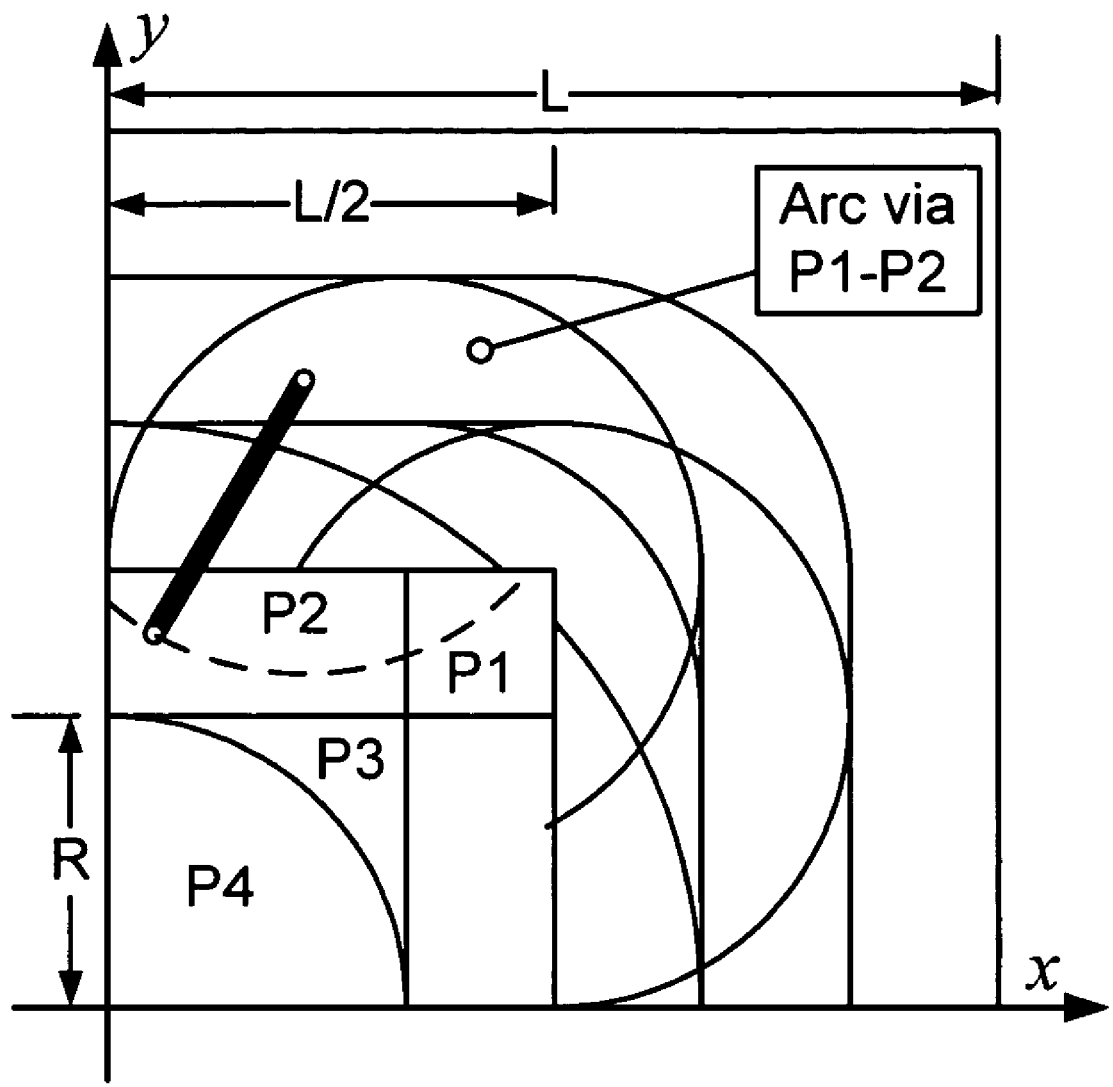
FIG. 7 is a graphical representation of the nineteen different regions on an example authentication object.

FIG. 7 is a graphical representation of the nineteen different regions on an example authentication object 700 that have distinct analytical formulae as a solution to the integral quantified in Equation 11. For brevity, $\phi(1,Q(x, y))$ is approximately solved using a simple numerical computation. The results is illustrated in FIG. 8

FIG. 8 is a graph of an example probability density function for a square authentication object with parameters L=64 and R=28 sampled at unit points. FIG. 8 shows that the likelihood that an endpoint of a fiber lands on a certain small area $P \subset S-S_1$ varies significantly depending on the particular position of P within $S-S_1$. By using the information about the variance of $\phi(i, Q(x, y))$ throughout $S-S_i$, the point-subset compression algorithms can be significantly improved, as presented in Section IV. Manufacturing authentication object such that $\phi(i, Q(x, y))$=const. over the entire area $S-S_i$, is a non-trivial task, probably as difficult as forging an original authentication object.

Definition 4. Possibly Illuminated Arc. For any point $A \subset S_i$, a function $\psi(i, A(x, y))$ is defined that measures the length of the part of the perimeter of C(A, R) contained by $S-S_i$.

Figure 9:
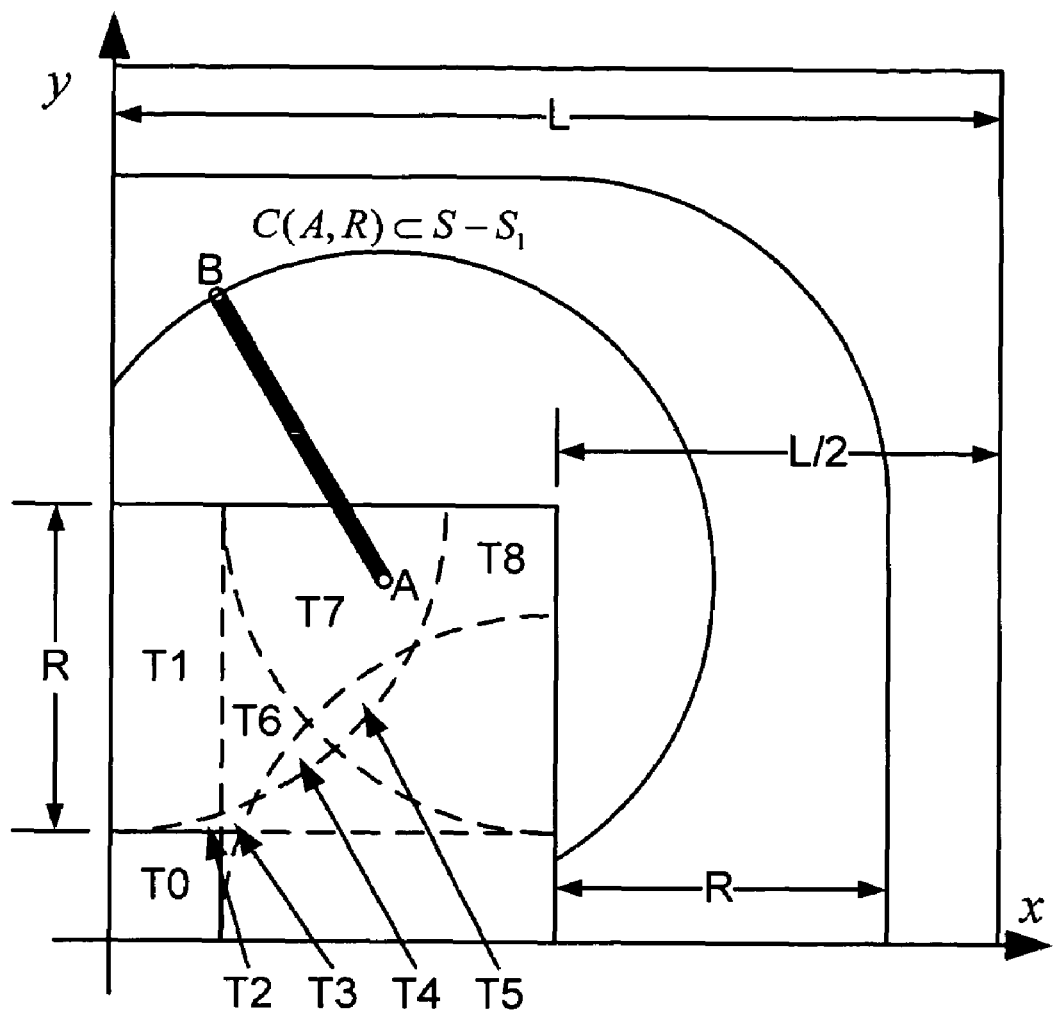
FIG. 9 is a graphical representation of areas in an authentication object.

FIG. 9 is a graphical representation of the areas T0-T8, where $\psi(i, Q(x, y))$ is computed using distinct closed analytical forms. $\psi(i, Q(x, y))$ is analytically computed based on the analysis of the events (i-ii) from Section III-A. Similarly to Section III-A, only in the case when region $S_1$ is lit up is computed. There are nine different regions in the COA (marked T0 through T8 in FIG. 9) where $\psi(1, Q)$ is computed uniformly. The analytical closed forms for $\psi(1,Q)$ depending on the location of Q within $S_1$ are given in Table 1.

Lemma 4. Dependence of $\psi(1, Q(x, y))$, $\rho(Q(x, y))$, and $\lambda$. The illumination ratio defined as in Def.3, can be computed as follows:

TABLE 1

| Area | Bounds | $\psi(1, Q(x, y))$ |
|---|---|---|
| T0 | $0 \leq x \leq L/2 - R, 0 \leq y \leq L/2 - R$ | 0 |
| T1 | $x^2 + (y - L/2)^2 < R^2, 0 \leq x \leq L/2 - R,$ $L/2 - R < y \leq L/2$ | $R\left[\arcsin\left(\frac{x}{R}\right) + \arccos\left(\frac{L/2 - y}{R}\right)\right]$ |
| T2 | $x^2 + (y - L/2)^2 \geq R^2, 0 \leq x \leq L/2 - R,$ $L/2 - R < y \leq L/2$ | $2R\arccos\left(\frac{L/2 - y}{R}\right)$ |
| T3 | $x^2 + (y - L/2)^2 \geq R^2,$ $(x - L/2)^2 + y^2 \geq R^2,$ $(x - L/2)^2 + (y - L/2)^2 \geq R^2$ | $2R\left[\arccos\left(\frac{L/2 - y}{R}\right) + \arccos\left(\frac{L/2 - x}{R}\right)\right]$ |
| T4 | $x^2 + (y - L/2)^2 < R^2,$ $(x - L/2)^2 + y^2 < R^2,$ $(x - L/2)^2 + (y - L/2)^2 \geq R^2$ | $R\left[\arcsin\left(\frac{x}{R}\right) + \arcsin\left(\frac{y}{R}\right)\right]$ $R\left[\arccos\left(\frac{L/2 - y}{R}\right) + \arccos\left(\frac{L/2 - x}{R}\right)\right] +$ |
| T5 | $x^2 + (y - L/2)^2 < R^2,$ $(x - L/2)^2 + y^2 < R^2,$ $(x - L/2)^2 + (y - L/2)^2 < R^2$ | $R\left[\frac{\pi}{2} + \arcsin\left(\frac{x}{R}\right) + \arcsin\left(\frac{y}{R}\right)\right]$ |
| T6 | $x^2 + (y - L/2)^2 < R^2,$ $(x - L/2)^2 + y^2 \geq R^2,$ $(x - L/2)^2 + (y - L/2)^2 \geq R^2,$ $L/2 - R < x \leq L/2$ | $R\left[\arcsin\left(\frac{x}{R}\right) + \arccos\left(\frac{L/2 - y}{R}\right)\right] +$ $2R\arccos\left(\frac{L/2 - x}{R}\right)$ |
| T7 | $x^2 + (y - L/2)^2 < R^2,$ $(x - L/2)^2 + y^2 \geq R^2,$ $(x - L/2)^2 + (y - L/2)^2 < R^2$ | $R\left[\frac{\pi}{2} + \arcsin\left(\frac{x}{R}\right) + \arccos\left(\frac{L/2 - x}{R}\right)\right]$ |
| T8 | $x^2 + (y - L/2)^2 \geq R^2,$ $(x - L/2)^2 + y^2 \geq R^2,$ $(x - L/2)^2 + (y - L/2)^2 < R^2$ | $R\left[\frac{\pi}{2} + \arccos\left(\frac{L/2 - y}{R}\right) + \arccos\left(\frac{L/2 - x}{R}\right)\right]$ |

B. Illumination Ratio of Fiber End-Points

Definition 3. Illumination Ratio of Fiber End-Points. For an authentication object (L,R,K) and its illuminated region $S_i$, the illumination ratio $\lambda$ is defined as a probability that a fiber $f=\{A, B\}$ has landed such that one of its end-points is in $B \subset S-S_i$ conditioned on the fact that the other end-point is in $A \subset S_i$:

$$\lambda = Pr[B \subset S-S_i | f=\{A,B\}, A \subset S_i]. \quad (14)$$

$$\lambda = \int_{Q(x,y) \subset S_i} \frac{\psi(i, Q(x, y))}{\varrho(Q)(x, y)} dxdy. \quad (15)$$

A circle centered at a point $A \subset S$ with radius R is denoted as C(A, R). For each point $Q \subset S_i$, the likelihood that the other end-point B of a fiber $f=\{Q, B\}$ lands within $S-S_i$, equals the ratio of lengths of parts of the perimeter of C(Q, R) contained by $S-S_i$ and $S$ respectively. By integrating this ratio over all points within $S_i$, Equation 15 is obtained.

Given an authentication object (L,R,K), using $\lambda$, computed by numerically approximating Equation 15 and the closed forms for $\psi(1,Q)$ from Table 1, one can compute the expected number of illuminated points in $S-S_1$. when $S_1$ is illuminated as $\lambda K/2$. For example, for an authentication object (64,28,100) the resulting $\lambda \approx 0.74$, which means that on the average, the number of illuminated endpoints in case $S_i$ is illuminated, is about $0.74 \cdot 50 = 37$.

IV. Compression of a Point-Subset in a COA

The goal of the certificate of authenticity system is to ensure that the task of manufacturing (i.e. forging) a specific authentication object instance as difficult as possible. This goal is quantified as a demand for recording the positions of as many as possible fibers of the authentication object. In the example compression algorithm, the number of regions of authentication object equals four; hence, for each region $S_i$, a quarter $n_M/4$ of bits in the signed message m is dedicated to storing as many as possible fiber end-points illuminated in $S-S_i$ once light is shed on $S_i$. Note that in general, not all illuminated points need to be stored; only the largest subset of these points that can be encoded using $n_M/4$ bits.

In this section, a mechanism is described, which is configured to encode the distance between two illuminated points in an authentication object. The mechanism is based on arithmetic coding. Next, the problem of compressing as many as possible fiber endpoints using a constant number of bits is formalized. Finally, the discussion will show that this problem is NP-complete and a constructive heuristic as a sub-optimal solution is presented.

A. Encoding Point-to-Point Vectors

In this subsection, how a vector defined by its starting and ending point is encoded using a near-minimal number of bits is described. An additional constraint is that the points in the considered area occur according to a given pdf.

1) Arithmetic coding:

An arithmetic coder (AC) converts an input stream of arbitrary length into a single rational number within $[0,1\}$. The principal strength of AC is that it can compress arbitrarily close to the entropy. The discussion below shows how a word "aba" is encoded given an alphabet with an unknown pdf of symbol occurrence.

Figure 10:
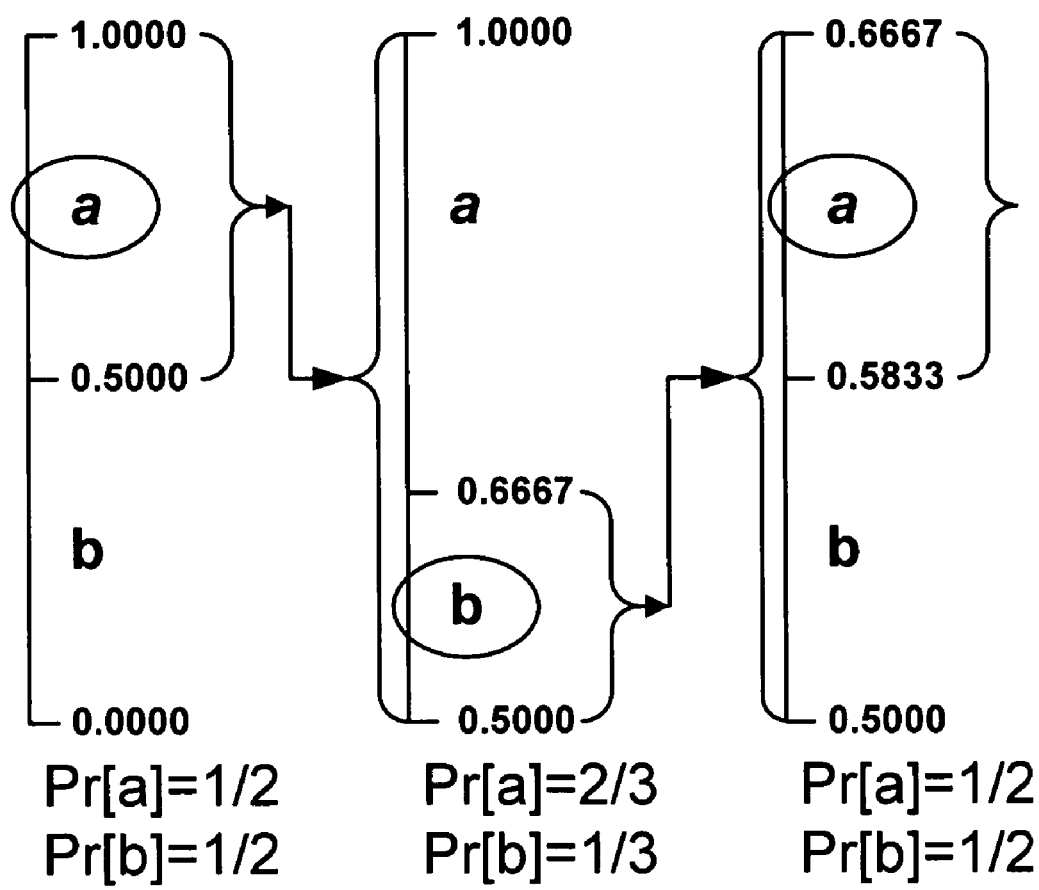
FIG. 10 is a graphical representation of an example of how an arithmetic coder encodes the string "aba".

FIG. 10 is a graphical representation of an example of how an arithmetic coder encodes the string "aba" is encoded given an alphabet L={a,b} with an unknown pdf of symbol occurrence. The example is illustrated in FIG. 10. Initially, the range of the AC is reset to [0,1} and each symbol in L is given an equal likelihood of occurrence Pr[a]=Pr[b]=½. Thus, the AC divides its range into two subranges [0,0.5} and [0.5,1}, each representing "b" and "a" respectively. Symbol a is encoded by constraining the range of the AC to the range that corresponds to this symbol, i.e., [0.5,1}. In addition, the AC updates the counter for the occurrence of symbol "a" and recomputes Pr[a]=⅔ and Pr[b]=⅓. In the next iteration, according to the updated Pr[a],Pr[b], the AC divides its range into [0.5,0.6667} and [0.6667,1}, each representing "b" and "a" respectively. When "b" arrives next, the AC reduces its range to the corresponding [0.5,0.6667}, updates Pr[a]=Pr[b]=2/4, and divides the new range into [0.5,0.5833} and [0.5833,0.6667}, each representing "b" and "a" respectively. Since the final symbol is "a", the AC encodes this symbol by choosing any number within [0.5833,0.6667} as an output. By choosing a number which encodes with the fewest number of bits (digits in our example), 0.6, the AC creates its final output. The decoder understands the message length either explicitly in the header of the compressed message or via a special "end-of-file" symbol.

The AC iteratively reduces its operating range up to a point when its range is such that the leading digit of the high and low bound are equal. Then, the leading digit can be transmitted. This process, called renormalization, enables compression of files of any length on limited precision arithmetic units. Performance improvements of classic AC focus on: using precomputed approximations of arithmetic calculations, replacing division and multiplication with shifting and addition.

An AC encodes a sequence of incoming symbols $s=s_1, s_2, \ldots$ using a number of bits equal to source's entropy, $H(s)=-\Sigma_{s_i} Pr[s_i]\log_2(Pr[s_i])$. Hence, for a semi-infinite stream of independent and identically distributed symbols, on a computer with infinite precision arithmetic, the AC is an optimal, entropy coder.

2. Arithmetic Encoding of a Min-Distance Point-to-Point Vector

Given an authentication object (L,R,K), it is assumed that light is shed on one of its quadrants, $S_i$. Next, we assume that the authentication object is partitioned into a grid of L×L unit squares U=u(i,j), i=1…L, j=1…L, where each u(i,j) covers the square area within $x \in \{i-1, i\}$, $y \in \{j-1, j\}$. Unit areas model the pixels of the digital scan of an authentication object. The resolution of the scan equals L×L. Next, a principal point of a unit u(x, y) is defined as a point $Q_u$ with coordinates (x, y).

Lemma 5. Unit Illumination Likelihood. Assuming there are $\kappa$ fibers with exactly one end-point in $S-S_i$, the probability that any unit area $u(x, y) \subset S-S_i$, contains at least one illuminated fiber end-point equals:

$$\tau(u) = Pr[(\exists f = \{A, B\} \in F) A \subset u, B \subset S_i] \qquad (16)$$
$$= 1 - [1 - \xi(i, u)]^\kappa.$$

And $$\tau(u) = Pr[(\exists f = \{A, B\} \in F) A \subset u, B \subset S_i]$$
$$= 1 - Pr[(\neg \exists c \in F) A \subset u, B \subset S_i]$$
$$= 1 - (1 - Pr[A \subset u, B \subset S_i \mid f = \{A, B\}])^\kappa.$$

From Equation 7, Equation 16 is concluded. In Section III-B, the expectation for $\kappa$ is $E[\kappa] = \lambda K/2$ is computed.

Problem 1. Dual Vector Encoding for COA. Conditioned on the fact that unit $u \subset S-S_i$ contains an illuminated fiber end-point, a goal is to encode using as few as possible bits the locations of two other illuminated units $v_1$ and $v_2$ relative to unit u. An additional constraint is that among all illuminated units in $S-S_i$, the principal points of $v_1$ and $v_2$, $Q_1$ and $Q_2$ respectively, are located at two shortest distances in Euclidean sense from the principal point of u, $Q_u$. A priority rule is set so that if a set of units V, |V|>1 are at the same distance with respect to u, the one with the highest likelihood of illumination: $\text{argmax}_{\tau \subset V}(\tau(v))$ is encoded first.

TABLE 2

ALGORITHM A1.

Set U as a list of all unit areas in $S - S_i - u$.
List of all marked units, M(u), is set to M(u) = Ø.
do
    Find all unit areas V = $\text{argmin}_{v \subset U} \|Q_v - Q_u\|$.
    do
        Find unit area w = $\text{argmax}_{v \in V} \xi(1,v)$.

TABLE 2-continued

ALGORITHM A1.

Set AC range for w to γ(w,u) (see Eqns.17,18).
Set of nodes ordered before w is $M_w(u) = M(u)$.
$M(u) = M(u) \cup w$, $V = V - w$, $U = U - w$.
 while $V \neq \emptyset$
while $U \neq \emptyset$ The encoding of a unit-to-unit vector is done using an AC, which uses algorithm A1 to assign a corresponding range on the encoding interval for each encoding symbol, i.e. each unit $v \subset S - S_i$ different from the source unit u. For each unit v, algorithm A1 assigns a range equal to the probability that v is one of the two closest illuminated units with respect to the source unit u. This probability is denoted as p(v|u). In the case when $\kappa >> 1$ units are expected to illuminate in $S - S_i$, p(v|u) can be computed as follows:

$$p(v \mid u) = \tau(v) \prod_{w \subset M_v(u)} [1 - \tau(w)] + \sum_{w \subset M_v(u)} \tau(v)\tau(w) \prod_{z \subset M_v(u), z \neq w} [1 - \tau(z)], \quad (17)$$

where the set of units $M_v(u)$ is computed as in algorithm A1. For each unit v, algorithm A1 assigns a range γ(v,u) used by the AC to encode v conditioned on the fact that u has already been encoded. This range is equal to:

$$\gamma(v, u) = \frac{p(v \mid u)}{\sum_{w \subset S - S_i} p(w \mid u)}. \quad (18)$$

Thus, the two nearest illuminated units are encoded by construction near-optimally (e.g. the encoding is optimal on a processor with infinite precision arithmetic) because a sequence of symbols is encoded using a number of bits approximately equal to the entropy of the source:

$$H(u) = -\sum_{v \subset S - S_i} \gamma(v, u) \log_2[\gamma(v, u)]. \quad (19)$$

Dual vector encoding is used as a primitive to encode a subset of points in the overall compression algorithm presented in the Section IV-B. Although the encoding algorithm is near-optimal for the set of assumptions presented in Section IV-A.2, the same set of constraints is not valid for the overall compression goal, hence, the inherent optimality of using arithmetic coding with range allocation via A1 is discussed in Section IV-B.

B. Compression of a Point-Subset

The optimization problem of compressing the positions of as many as possible illuminated unit areas using a fixed number of bits is modeled. Consider the following directed complete graph with weighted edges. For each illuminated unit $u \subset S - S_i$, a node $n_u$ is created. A directed edge e(u,v) from node $n_u$ to node $n_v$ is weighted with the optimal length of the codeword that encodes the vector that points to v, $\omega(e(u,v)) = -\log_2 [\gamma(v,u)]$ as in Equation 19, conditioned on the fact that u is already encoded. Lets denote this graph as G(N, E, Ω), where N, E, and Ω represent the set of nodes, directed edges, and corresponding weights respectively.

Problem 2. Compression of a Point-Subset (CPS).

INSTANCE: Directed, complete, and weighted graph G(N,E) with a non-negative vertex function Ω: E→R, positive integer $l_{min} \in Z^+$, positive real number $\Lambda \in R^+$.

QUESTION: Is there a subset of $l > l_{min}$ nodes $N^* \subset N$ with a path through them, i.e. a permutation $<n^*_{\pi(1)}, \ldots, n^*_{\pi(l)}>$, such that the sum of weights along the path is:

$$\sum_{i=1}^{l-1} \omega(e(n^*_{\pi(i)}, n^*_{\pi(i+1)})) < \Lambda. \quad (20)$$

Problem 2 models the optimization problem of compressing as many as possible (i.e. l) fiber end-points in an authentication object using a fixed storage (i.e. Λ). This problem is NP-complete as it can be shown that the ASYMMETRIC TRAVELING SALESMAN PROBLEM, ATSP, can be reduced to CPS, ATSP$\leq_m^P$CPS, via binary search for Λ. In the remainder of this section, an efficient constructive heuristic A2 is presented that aims at solving this problem. The premier design requirement for the heuristic is fast run-time performance because each certificate of authenticity must be signed separately at a manufacturing line.

First, the distance measure between two nodes in N does not obey the triangle inequality for all nodes. Intuitively, the encoding procedure from Section IV-A encodes vectors in $S - S_i$ using a number of bits proportional to the likelihood that a certain unit is one of the two closest illuminated points. Hence, units farther from the source node are encoded with significantly longer codewords as they are unlikely to occur, which renders shortcuts to these nodes in the solution route highly undesirable.

Theorem 2. The distance measure ω does not universally obey the triangle inequality:

$$\omega(e(u, v)) + \omega(e(v, w)) \geq \omega(u, w).$$

For simplicity, assume that $(\forall u \subset S - S_i)$ $t = \tau(u) = $const., then u, v, and w are positioned along the same line in $S - S_i$. The Euclidean distances $\|u-v\|$, $\|v-w\|$, and $\|u-w\|$ are a, b, and a+b respectively. The triangle inequality implies that f(u, v, w)=$\log_2[\gamma(w,u)] - \log_2[\gamma(v,u)] - \log_2[\gamma(w,v)] \geq 0$. From Equations 17 and 18, the following can be computed:

$$f(a, b, t) = 2ab\pi t \log_2(1-t) + \log_2 \frac{t}{1-t} - \quad (21)$$
$$\log_2 \frac{(1-t)^2 + (a^2+b^2)\pi t(1-t) + a^4 b^4 \pi^2 t^2}{1 + [(a+b)^2 \pi - 1]t},$$

and show that for $ab\pi t >> 1$, the triangle inequality does not hold, i.e., f(a,b,t)<0.

The best approximation algorithm for ATSP where the triangle inequality holds, yields solutions at most log(|N|) times worse than the optimal. Alternatively, to the best knowledge of the authors, approximation algorithms for ATSP variants where the triangle inequality does not hold, have not been developed. In the general case, when the distance metric function ω is arbitrary, the ATSP problem is NPO-complete, i.e. there is no good approximation algorithm unless P=NP. On the other hand, approximation algorithms for variants of TSP which satisfy a scaled version of the triangle inequality:

$\mu(\omega(e(u, v))+\omega(e(v, w))) \geq \omega(u, w)$, $\mu \geq 1$ can be solved with a worst case result $(3\mu+1)\mu/2$ times worse than the optimal solution. Distance metric $\omega$ does not follow this constraint, hence, a heuristic for Problem 2 is developed without a worst-case guarantee. In addition, we aim for as good as possible performance of the heuristic on the average, rather than a worst-case guarantee. Authentication object instance which cannot be compressed satisfactorily can be disposed. Likelihood of this event should be small, less than one in a million.

TABLE 3

ALGORITHM A2

CONSTRUCTIVE PHASE

Set of edges E' = $\{argmin_e(\omega(a,b),\omega(b,a)) | (\forall a,b) \subset N\}$.
Set of subpaths P is selected as a set of shortest K edges in E' s.t. $\sum_{i=1}^{K} \omega(e_i) \leq \Lambda$ sorted by $\omega$.

Denote the weight of the shortest edge in E as $\omega_{min}$.
for each path $p_i \subset P$, i = 1..K − 1
  for each path $p_j \subset P$, j = i + 1..K
    if $p_i$ and $p_j$ have a common source-destination node
      Concatenate $p_i$ and $p_j$ as $p_i = p_i | p_j$.
      Remove $p_j$ from P.
Denote source and destination nodes of a path $p_i \subset P$
as $s_i$ and $d_i$ respectively.
for each path $p_i \subset P$, i = 1..K
  Find all shortest paths q(i, j) from $s_i$ to any $d_j$, j ≠ i.
while |P|<maxP $(p_i, p_j) = argmin_{q(i,j)} \sum_{e \subset \{p_i | q(i,j) | p_j\}} \frac{\omega(e)}{|\{p_i | q(i, j) | p_j\}|}$.

Concatenate $p_i = p_i | q(i,j) | p_j$ and remove $p_j$ from P.
Find exhaustively a concatenation $p_h = p_1 | ... | p_{maxP}$ s.t $M(p_h)\left\{\sum_{e \subset p_h} \omega(e) < \Lambda \text{ and } |p_h| \text{ is maximal}\right\}$.

reroute( $p_h$ )
  reroute( $p_h$ )
  $p_{best} = p_h$
  for each edge $e(s_i, d_i) \subset p_h$, i = 1,...,| $p_h$ | −1
    for each node pair $(d_i, s_j) \subset p_h$, j = i + 2,...,| $p_h$ | −1.
    Find shortest path q(i, j) via nodes in N − $p_h$.

if path $e_1, ..., e_i | q(i, j) | e_j, ..., e_{|p_h|}$ has a better metric

M($p_h$) then $p_{best}$
      then $p_{best} = p_h$.
GREEDY ITERATIVE IMPROVEMENT repeat I times Contract $p_h$ so that $\sum_{e \subset p_h} \omega(e) \leq \rho\Lambda$, where $\rho$ is a contraction factor, randomly chosen from $\rho \in \{0.4, 0.8\}$.
Denote nodes $n_0$ and $n_l$ as the first and last node in $p_h$.

while $\sum_{e \subset p_h} \omega(e) \leq \Lambda$

Among edges that have $n_0$ or $n_l$ as destination or
  source respectively, find edge e with minimal weight.
  Concatenate e to $p_h$.
rereoute( $p_h$ )

The rationale behind using the distance metric $\omega$ from Section IV-A is based on an assumption that a good solution succeeds to traverse each node on its route via the two closest neighboring nodes. Hence, in the scope of Problem 2, the used metric is optimal only if the best solution found satisfies this property. If the final solution does not have this property, the optimality of encoding a single vector is dependent upon the distribution of weights of the edges in the solution.

The developed heuristic A2 has two stages: a constructive and an iterative improvement phase. The constructive phase follows a greedy heuristic which builds the initial solution. Initially, A2 identifies a set of dominating edges E'. For each pair of edges, e(u, v), e(v,u), between nodes u,v, A2 selects only the shorter of the two and stores it in E'. Next, a set P of initial subpaths is created by sorting the edges in E' and selecting the top K shortest edges whose weights sum up as close as possible to $\Lambda$. The first and last node in a path $p_i$ are denoted as $s_i$ and $d_i$ respectively. In the next step, A2 concatenates subpaths from P iteratively in the increasing order of their weights: at any point, the pair of shortest subpaths $p_i$, $p_j$ which have a common source-destination node $d_i = s_j$, is concatenated until all possible connections are established. In the unlikely case when |P|=1, the optimal solution is found and the search is stopped. Else, all single-edge subpaths are removed from P. Then, using Dijkstra's algorithm, A2 finds all shortest paths between each destination tail $d_i$ of each subpath $p_i$ in P and source tails of all other subpaths, $s_j$, i= 1 ... |P|, i≠j. The shortest paths are routed via nodes which are not in P. The shortest path is denoted between $s_i$ and $d_j$ as q(i,j). In another greedy step, A2 sorts all concatenations $p_i | q(i,j) | p_j$ according to their weight/node count ratio. In increasing order of this metric, A2 continues concatenating subpaths in P via nodes in N−P until the total number of remaining paths is |P|=maxP (usually maxP=9). The remaining paths are concatenated using an exact algorithm which finds a path $p_h$ with the optimal metric: maximal cardinality and a sum of weights smaller than $\Lambda$. In the final step, a rerouting procedure browses all the nodes in P, and using the Dijkstra algorithm tries to find shortest paths to other nodes in P via the remaining nodes in E. The same procedure also tries to find a better ending tail than the one that exists in $p_h$. For each reroute, A2 checks whether the new reroute has a better metric than the current, best path $p_h$.

Figure 11:
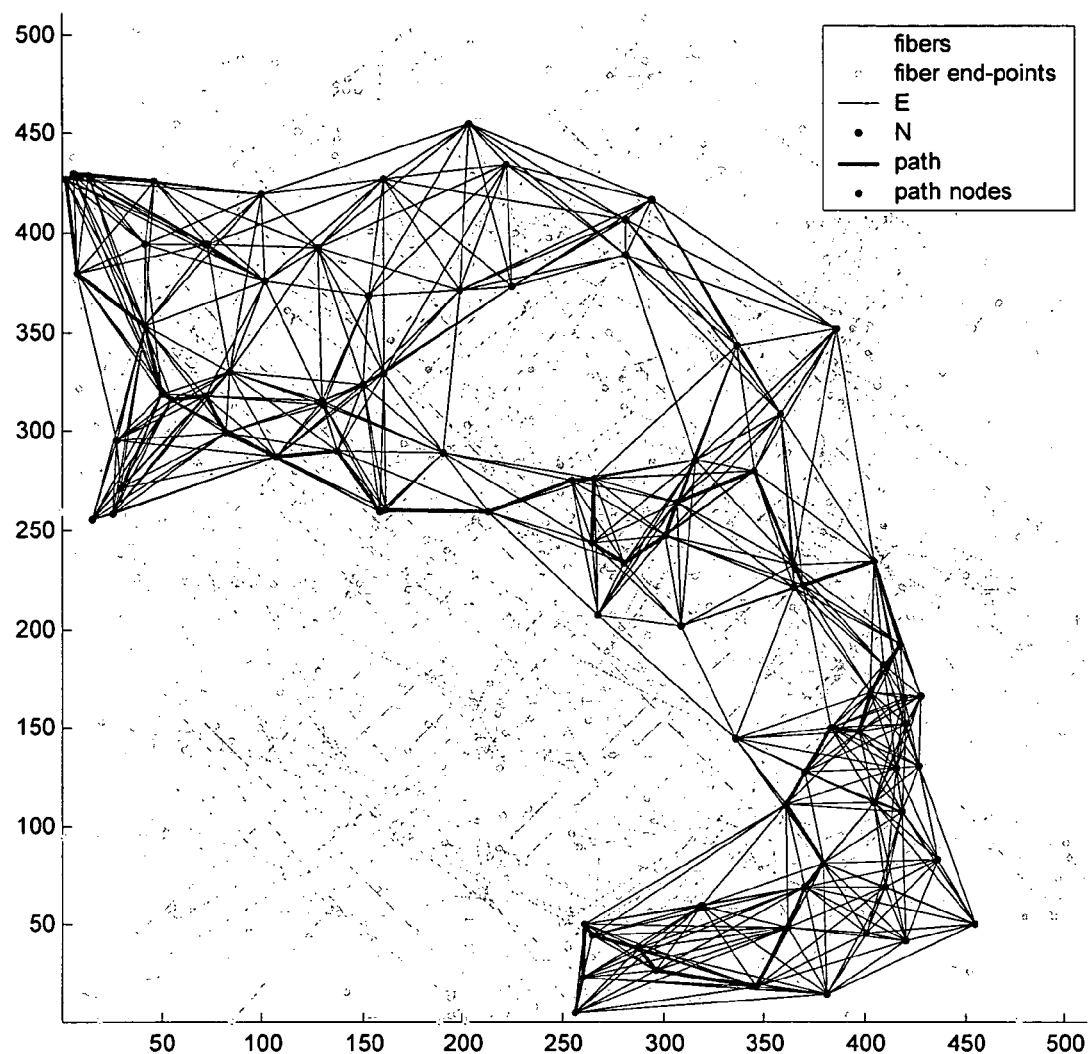
FIG. 11 is an example of an instance of an authentication object shown with nodes.

FIG. 11 is an example of an instance of an authentication object (512,0.4·512,256) is shown with κ=88 nodes. A2 returned the path illustrated with bold lines. The path is such that its sum of weights is smaller than $\Lambda$=512. To document the path, 12.11 bits per point is used.

In the iterative improvement phase, we repeat several rounds of the following loop. In the first step, A2 contracts the currently best found path $p_{best}$ into $p_h$, so that $|p_h|$ is maximal and the sum of weights along $p_h$ is smaller than a fraction of $\rho\Lambda$. The contraction parameter $\rho$ is randomly selected in each iteration within $\rho \in \{0.4, 0.8\}$. Nodes $n_0$ and $n_l$ are denoted as the first and last node in $p_h$. While the sum of weights in $p_h$ is smaller than $\Lambda$, among edges that have $n_0$ or $n_l$ as destination or source respectively, we find an edge e with minimal weight and concatenate it to $p_h$. When the new candidate path $p_h$ is created, it is adopted as the best solution if its metric is better than the metric of the best path created so far. As a last step of the iterative improvement loop, A2 performs the rerouting procedure previously described.

In order to fit the run-time of A2 for a particular authentication object (L,R,K) class within one second, the improvement loop is repeated I={100,10000} times. In general, the worst-time complexity of A2 is $O(|N|^3 \log|N|)$ as multi-source shortest paths are computed via the Dijkstra algorithm. In an implementation that uses the Floyd-Warshall algorithm to compute all pairs shortest paths, the complexity of A2 can be reduced to $O(|N|^3)$. Although the graph is originally complete, by removing edges with high weights, we create a sparse graph, where Johnson's algorithm for all-pairs shortest paths yields $O(|N|^2 \log|N|+|N||E|)$.

V. Empirical Evaluation

The discussion in this section shows how authentication object (L,R,K) parameters impact the performance of the algorithm A.2. FIG. 11 illustrates a solution to a single instance of the problem, an authentication object (512,0.4·512,256). The scanning grid to L=512 scanning cells. The FIG. depicts the case when the lower left quadrant of the authentication object is illuminated. Graph G(N, E), built using the corresponding illuminated fiber end-points, is illustrated with medium bold lines. Only the top ten shortest edges starting from each of the κ=88 nodes in the graph is shown. The resulting path shown in the figure using bold lines, consists of 41 nodes. The sum of weights along path's edges is smaller than the storage limit: Λ=512 bits. The path is compressed using 12.11 bits per fiber end-point (b/fep). Storing the data without compression would require 41·18=738 bits, which results in a compression ratio of 0.61. The compression ratio is defined as a ratio of the size of the compressed message vs. the original message size.

VI. A Design Objective for a COA System

A goal of the certificate of authenticity designer is to maximize the cost of forgery $\varsigma_f$ using a bounded manufacturing cost $\varsigma_m$. Several parameters may impact $\varsigma_m$. For brevity and simplicity, three parameters are discussed:

the total length of fiber $RK \leq \Phi$, the scanning tolerance $\zeta$, and the barcode storage $\Lambda$.

System performance is optimized by limiting the number of trials available to the adversary for accurate positioning of a sufficient subset of the signed fiber end-points (Section VI-A) and by selecting the system parameters $\{R_*, K_*\}$ so that expected forging cost $\varsigma_f(A2)$ is maximized (Section VI-B).

A. Limiting the Number of Adversarial Trials

Consider a compression scheme C which stores G out of the κ illuminated fiber end-points in a Λ-limited storage. In general, when forging a certificate of authenticity, the adversary can use all κ fibers to try to place at least $G\zeta$ of them accurately at their corresponding locations. Cost of forging a certificate of authenticity greatly depends upon the number of available trials. Here, a technique is proposed which aims at reducing the number of adversarial trials, $K_T$, by detecting anomalous distribution of fibers around the signed fiber end-points during verification.

TABLE 4

ALGORITHM A3

ISSUING A COA INSTANCE
Scan for a set N of κ points, illuminated when light is shed on $S_i$.
Using Λ bits, compress a subset $P \subset N$, with $G = |P| \leq \kappa$.
Find a subset of units $U \subset S - S_i$, such that
   $(\forall u_i \in U)(\forall p_j \in P) \min(||u_i - p_j||) < \epsilon_1$.
$\epsilon_2 = |N \cap U| - G$, $K_T = G + \epsilon_2$.
Sign P, $\epsilon_2$ and the associated information (see Section 2).
VERIFYING A COA INSTANCE
Extract P,$\epsilon_2$ from signature.
Find a subset of units $U \subset S - S_i$, such that
   $(\forall u_i \in U)(\forall p_j \in P) \min(||u_i - p_j||) < \epsilon_1$.
Scan for a set N' of κ' points, illuminated when light is shed on $S_i$.
if $|N' \cap U| > K_T$ then COA instance is invalid,
elseif $|N' \cap P| \geq G\zeta$ then COA instance is valid,
else COA instance is invalid.

The certificate of authenticity issuer and verifier repeat their parts of the algorithm A3 for each authentication object quadrant $S_i$. The issuer initially scans the authentication object instance and collects information about the set of points N which illuminate when $S_i$ is lit up. Next, using the available Λ bits, it compresses the largest subset $P \subset N$, $|P|=G$ returned by A2. Then, A3 finds a subset $U \subset S-S_i$, such that the Euclidean distance between each unit $u_i \in U$ and its closest unit $p_j \in P$ is at most $\epsilon_1$. Subset U of units represents an $\epsilon_1$-neighborhood of P. Then, the issuer counts the number $K_T$ of points in N that exist in U. Since, $K_T$ has to be greater than G to prevent false negatives, the issuer stores along with P, the difference $\epsilon_2 = K_T - G$ in the message m, which is later signed using the private key of the issuer (see Section II). Using the public key of the issuer, the verifier extracts from the attached signature the compressed point subset P and $\epsilon_2$ and recreates the corresponding $\epsilon_1$-neighborhood, U. Then, the verifier scans the authentication object instance for the set of illuminated fibers N' when $S_i$ is lit up. It announces that the instance is authentic by checking that the number of common points in U and N' is at most $G+\epsilon_2$ and that the number of common points in N' and P is at least $G\zeta$.

By storing $\epsilon_2$ in the signature, the adversary is imposed to use at most $K_T = G+\epsilon_2$ trials that position fibers in the $\epsilon_1$-neighborhood of P. The adversary's goal is to place at least $G\zeta$ fiber end-points from P accurately, hence, the adversary can afford $G(1-\zeta)+\epsilon_2$ misplacements located in the $\epsilon_1$-neighborhood of P during the forging process. It is expected that each trial, targeting a point $p_i$, if unsuccessful, ends up in the $\epsilon_1$-neighborhood of $p_i$. By increasing $\epsilon_1$, the verifier can identify possible misplacements over a larger neighborhood; however, this also increases the expectation for $\epsilon_2$—a value that the certificate of authenticity designer wants to keep as low as possible.

Below, an empirical design methodology is shown which adopts a given $\epsilon_1$=const., and then seeks to maximize the main objective $\varsigma_f(A2)$ from the perspective of several certificate of authenticity parameters.

B. Designing a COA System

Problem 3. A Design Objective for a COA System. For a given compression algorithm A2, fixed $RK \leq \Phi$, $\zeta$, $\epsilon_1$, and Λ, find a cut $\{R_*, K_*\}$ of the available fiber which maximizes:

$$\{R_*, K_*\} = \arg\max_{\{R,K|RK \leq \Phi\}} \varsigma_f(A2, R, K), \qquad (22)$$

where $\varsigma_f$ is defined in Lemma 2. Note that the number of trials κ in Eqn.2 equals $K_T$ as presented in Subsection VI-A. Compression performance G in Equation 2 depends upon the efficacy of A2.

Figure 12:
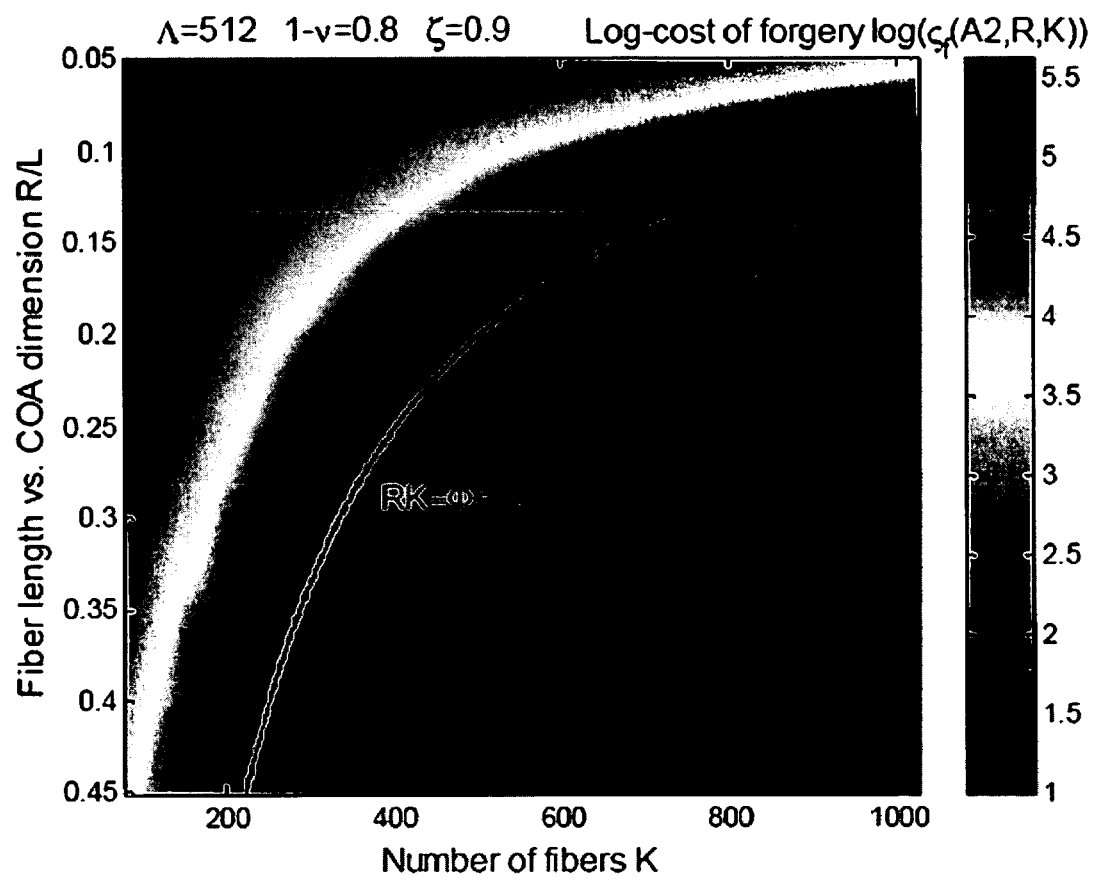
FIG. 12 is a graphical representation of a certificate of authenticity designed for optimizing cost effectiveness.

FIG. 12 is a graphical representation of a certificate of authenticity design for optimized cost effectiveness. The abscissa quantifies fiber length R relative to L, while the ordinate shows the number of fibers K. The bar illustrates the log-cost of forgery $\log_{10}(\varsigma_f(A2,R,K))$ with a constraint limit Λ=512 bits and a set of fixed parameters: $\zeta$=0.9, $\epsilon_1$=8, and ν=0.8. The figure also illustrates the quality of solutions obtained for all cuts of a fixed length fiber $RK=\Phi=100L$.

A simple empirical technique may be used that searches for the best fiber cut $\{R_*,K_*\}$. The search procedure is illustrated using FIG. 12. The abscissa and the ordinate represent the values of R and K respectively. The bar denotes the expected log-cost of forging an certificate of authenticity instance, $\log_{10}(\varsigma_f(A2, RK))$. The cost is given with respect to R and K, and for a fixed set of parameters: Λ=512, $\zeta$=0.9, $\epsilon_1$=8, and ν=0.8. The diagram in FIG. 12 was computed empirically. A2 is applied to 500 randomly generated certificate of authenticity (512,R,K) instances with each combination of R={0.05L, 0.10L, ..., 0.45L} and K={80,96, ..., 192, 256, 384, 512, 768, 1024}. The expected compression performance for each point in the remaining portion of the {R, K}-space was obtained by interpolating the empirical results. From FIG. 12, the best fiber cut can be found in the neighborhood of $K_* \approx 900$ and $R_* \approx 0.1L$. This result points to the fact that for the selected design environment, a cross-shaped certificate of authenticity is the best option. Note that careful selection of the fiber cut resulted in an order of magnitude improvement in the forgery cost with respect to a randomly selected point on $RK=\Phi$. The empirical principles used in this example, can be applied to search for a near-optimal parameter set for different certificate of authenticity environments and manufacturing constraints.

Figure 13:
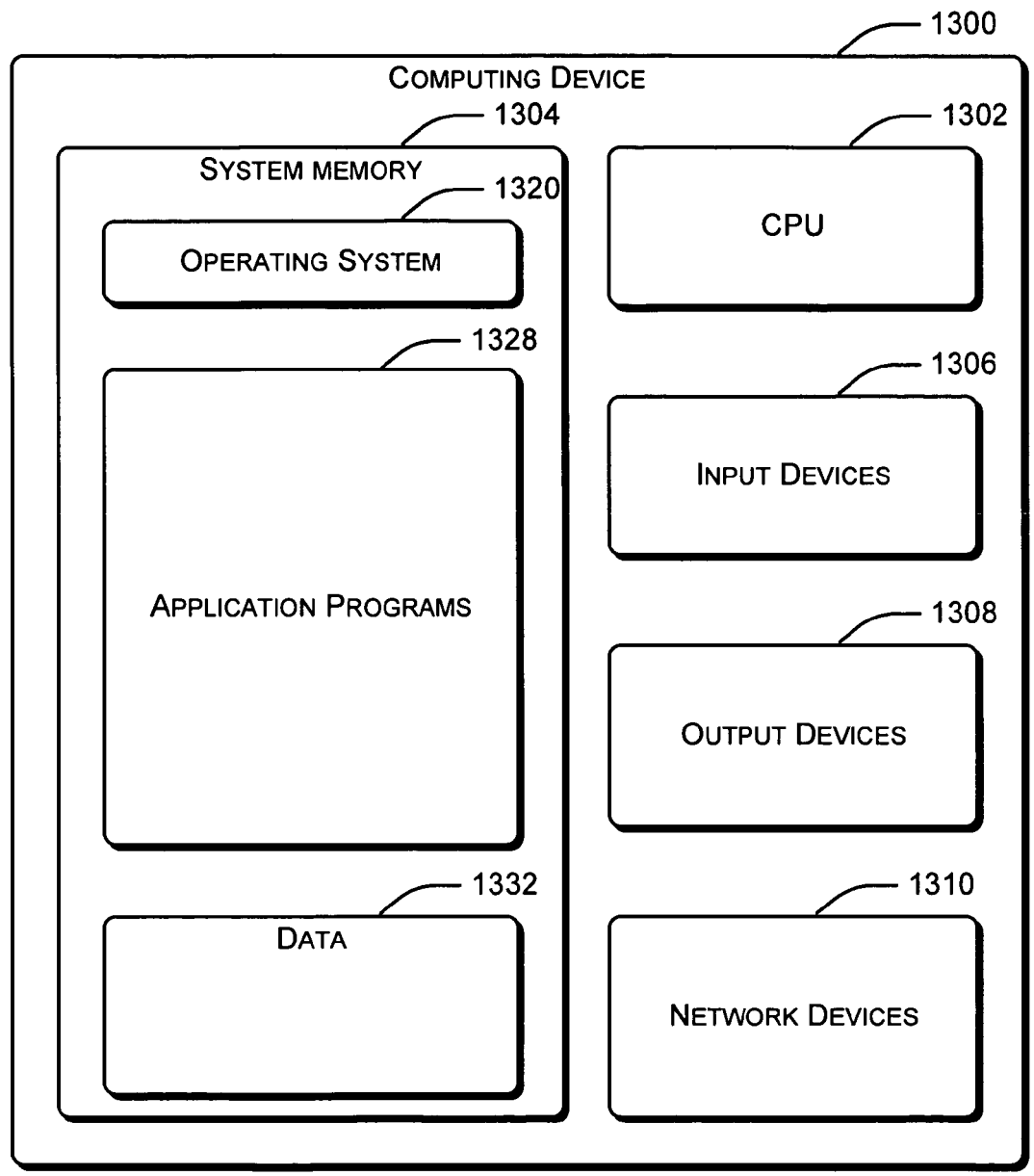
FIG. 13 illustrates an example computing device which the described systems and methods can be either fully or partially implemented.

FIG. 13 illustrates an example computing device 1300 within which the described systems and methods can be either fully or partially implemented. Computing device 1300 is only one example of a computing system and is not intended to suggest any limitation as to the scope of the use or functionality of the invention.

Computing device 1300 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 1300 can include, but are not limited to, processor 1302 (e.g., any of microprocessors, controllers, and the like), system memory 1304, input devices 1306, output devices 1308, and network devices 1310.

Computing device 1300 typically includes a variety of computer-readable media. Such media can be any available media that is accessible by computing device 1300 and includes both volatile and non-volatile media, removable and non-removable media. System memory 1304 includes computer-readable media in the form of volatile memory, such as random access memory (RAM), and/or non-volatile memory, such as read only memory (ROM). A basic input/output system (BIOS), containing the basic routines that help to transfer information between elements within computing device 1300, such as during start-up, is stored in system memory 1304. System memory 1304 typically contains data and/or program modules that are immediately accessible to and/or presently operated on by processor 1302.

System memory 1304 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 1300. It is to be appreciated that other types of computer-readable media which can store data that is accessible by computing device 1300, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 1300. Any number of program modules can be stored in system memory 1304, including by way of example, an operating system 1320, application programs 1328, and data 1332.

Computing device 1300 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 1300 via input devices 1306 such as a keyboard and a pointing device (e.g., a "mouse"). Other input devices 1306 may include a microphone, joystick, game pad, controller, satellite dish, serial port, scanner, touch screen, touch pads, key pads, and/or the like. Output devices 1308 may include a CRT monitor, LCD screen, speakers, printers, and the like.

Computing device 1300 may include network devices 1310 for connecting to computer networks, such as local area network (LAN), wide area network (WAN), and the like.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
    determining randomly distributed features in an object;
    determining a probability density function associated with the object;
    compressing data representing the randomly distributed features, wherein the compressing is based in part on the probability density function;
    encoding the compressed data with a signature; and
    creating a label comprising the object and the encoded data;
    determining vectors associated with the randomly distributed features based, at least in part, on the probability density function; and
    encoding the vectors using an arithmetic coding algorithm, wherein the algorithm comprises:
    set U as a list of all unit areas in $S-S_i-u$
    list of all marked units, M(u), is set to $M(u)=\emptyset$
    do
        find all unit areas $V=\text{argmin}_{v \subset U}\|Q_v-Q_u\|$
        do
            find unit area $w=\text{argmax}_{v \in V}\zeta(1, v)$
            set AC range for w to $\gamma(w,u)$
            set of nodes ordered before w is $M_w(u)=M(u)$
            $M(u)=M(u) \cup w$, $V=V-w$, $U=U-w$
        while $V \neq \emptyset$
    while $U \neq \emptyset$.

2. The method as recited in claim 1, wherein encoding the vectors using the arithmetic coding algorithm includes determining a path for connecting a portion of the vectors within a fixed amount of data.

3. The method as recited in claim 1, wherein the randomly distributed features are fibers that are randomly positioned in the object.

4. The method as recited in claim 3, wherein the probability density function represents a probability that fibers in the particular region are illuminated by a light source.

5. The method as recited in claim 3, wherein the probability density function is derived based, at least in part, on the length of the fibers.

6. The method as recited in claim 3, wherein each vector represents the end points of two fibers.

7. The method as recited in claim 1, wherein the data is encoded with a private key.

8. The method as recited in claim 1, wherein the label is a certificate of authenticity configured to be self-authenticated and wherein the object is an authentication object included in the certificate of authenticity.

9. The method as recited in claim 1, wherein the encoded data is included in the label as a barcode.

10. The method as recited in claim 1, further comprising:
determining textual data that includes a string of characters;
hashing the textual data with an algorithm;
encrypting the compressed data using the hashed textual data; and
including the textual data in the label.

11. The method as recited in claim 10, wherein the algorithm is a cryptographically secure hash algorithm.

12. The method as recited in claim 10, wherein the algorithm is an SHA1 cryptographical algorithm.

13. One or more computer-readable memories containing instructions that are executable by a processor to perform the method recited in claim 1.

14. A system comprising
an issuer configured to determine randomly distributed features in an authentication object and to compress data representing the randomly distributed features comprising fibers, the issuer being further configured to encode the compressed data with a signature and to create a label that includes the authentication object and the encoded data;
wherein the issuer is further configured to determine a probability density function associated with the authentication object, wherein the probability density function is defined as the likelihood of finding a second end of a fiber at a given location within a non-illuminated area when a first end of the fiber is located within an illuminated area of the authentication object, to determine vectors associated with the randomly distributed attributes based, at least in part, on the probability density function, and to encode a portion of the vectors as a path by applying an arithmetic coding algorithm, wherein the algorithm comprises:
set U as a list of all unit areas in $S-S_i-u$
list of all marked units, M(u), is set to M(u)=Ø
do
  find all unit areas V=argmin$_{v \subset U}$||Q$_v$−Q$_u$||
  do
    find unit area w=argmax$_{v \in V}$ζ(1, v)
    set AC range for w to γ(w,u)
    set of nodes ordered before w is M$_w$(u)=M(u)
    M(u)=M(u)∪w, V=V−w, U=U−w
  while V≠Ø
while U≠Ø.

15. The system as recited in claim 14, wherein the probability density function utilizes a perimeter containment function.

16. The system as recited in claim 15, wherein the perimeter containment function assumes that the first end of the fiber can be located anywhere within the authentication object and that the second end of the fiber will be in a location dependent on a location of the first end of the fiber.

17. The system as recited in claim 15, wherein the perimeter containment function comprises different instances, depending on intersection of a perimeter with edges of the authentication object.

18. The system as recited in claim 14, wherein the determined vectors are encoded using a near-minimal number of bits type algorithm.

19. The system as recited in claim 14, further comprising:
a verifier configured to decode the data representing the randomly distributed features in the label and to authenticate the label by comparing the decoded data with the data of the actual randomly distributed features determined from the authentication object.

20. A label comprising:
an authentication object including randomly distributed features; and
encoded information associated with the authentication object, the information being encoded with a signature and including compressed data representing the randomly distributed features in the authentication object, wherein the data in the encoded information is compressed by:
determining a probability density function associated with the authentication object;
determining vectors associated with the randomly distributed attributes based, at least in part, on the probability density function; and
encoding the vectors using an arithmetic coding algorithm;
wherein the label is self-authenticated by comparing the compressed data in the encoded information and the data representing the randomly distributed features obtained by analyzing the authentication object; and
wherein the compressed data was compressed by:
determining vectors associated with the randomly distributed features based, at least in part, on the probability density function; and
encoding the vectors using an arithmetic coding algorithm, wherein the algorithm comprises:
set U as a list of all unit areas in $S-S_i-u$,
list of all marked units, M(u), is set to M(u)=Ø,
do
  find all unit areas V=argmin$_{v \subset U}$||Q$_v$−Q$_u$||, do
  find unit area w=argmax$_{v \in V}$ζ(1, v),
  set AC range for w to γ(w,u) (see Eqns. 17, 18),
  set of nodes ordered before w is M$_w$(u)=M(u),
  M(u)=M(u)∪w, V=V−w, U=U−w,
while V≠Ø
while U≠Ø.

21. The label as recited in claim 20, wherein encoded information is included in the label as a barcode.

22. The label as recited in claim 20, wherein encoded information is encoded using a private key.

23. The label as recited in claim 20, further comprising:
textual data that includes a string of characters, wherein the compressed data is encrypted using the textual data.

24. The label as recited in claim 23, wherein compressed data is encrypted by:
hashing the textual data with an algorithm; and
encrypting the compressed data using the hashed textual data.

25. An apparatus comprising:
means for determining randomly distributed features in an authentication object;
  means for determining a probability density function associated with the authentication object, wherein the probability density function defines a likelihood a point will contain an illuminated second end of a fiber and is conditioned on location of a first end of the fiber in an illuminated region;
means for compressing data representing the randomly distributed features, wherein the compressing is based in part on the probability density function;
means for encoding the data with a signature; and
means for creating a label that includes the authentication object and the encoded data,
means for determining vectors associated with the randomly distributed features based, at least in part, on the probability density function; and
means for encoding the vectors using an arithmetic coding algorithm, wherein the algorithm comprises:
  set U as a list of all unit areas in $S-S_i-u$,
  list of all marked units, $M(u)$, is set to $M(u)=\emptyset$,
  do
    find all unit areas $V=\mathrm{argmin}_{v \subset U} \|Q_v - Q_u\|$,
    do
      find unit area $w=\mathrm{argmax}_{v \in V} \zeta(1, v)$,
      set AC range for w to $\gamma(w,u)$ (see Eqns. 17, 18),
      set of nodes ordered before w is $M_w(u)=M(u)$,
      $M(u)=M(u) \cup w$, $V=V-w$, $U=U-w$,
    while $V \neq \emptyset$
  while $U \neq \emptyset$.

26. The apparatus as recited in claim 25, further comprising
means for incorporating fibers in the authentication object as the randomly distributed features.

27. The apparatus as recited in claim 25, further comprising:
means for determining vectors associated with the randomly distributed features based, at least in part, on the probability density function; and
means for encoding the vectors using an arithmetic coding algorithm.

28. The method as recited in claim 25, further comprising:
means for determining textual data that includes a string of characters;
means for hashing the textual data with an algorithm;
means for encrypting the compressed data using the hashed textual data; and
means for including the textual data in the label.

29. The apparatus as recited in claim 25, further comprising:
means for authenticating the label by comparing encoded data with the data associated with the randomly distributed features in the authentication object.

* * * * *